(12) United States Patent
Oltman et al.

(10) Patent No.: US 7,796,501 B2
(45) Date of Patent: Sep. 14, 2010

(54) SYSTEM AND METHODS FOR REDUNDANT SWITCH FABRIC AND SWITCH CONTROLLER

(75) Inventors: John Oltman, Chamblee, GA (US);
Manuel Damas, Alpharetta, GA (US);
Jeffrey M. Bushman, Altanta, GA (US)

(73) Assignee: Ciena Corporation, Linthicum, MD (US)

( * ) Notice: Subject to any disclaimer, the term of this patent is extended or adjusted under 35 U.S.C. 154(b) by 223 days.

(21) Appl. No.: 11/954,852

(22) Filed: Dec. 12, 2007

(65) Prior Publication Data

US 2009/0154342 A1 Jun. 18, 2009

(51) Int. Cl.
*G01R 31/08* (2006.01)
*H04L 12/28* (2006.01)

(52) U.S. Cl. .................. 370/216; 370/386; 370/388; 370/419

(58) Field of Classification Search ............. 370/388, 370/216, 219, 220, 217, 218, 359, 360, 419, 370/420, 389, 392, 396, 400, 390
See application file for complete search history.

(56) References Cited

U.S. PATENT DOCUMENTS

| 7,313,089 | B2 * | 12/2007 | Moller et al. | 370/219 |
| 7,453,797 | B2 * | 11/2008 | Deval et al. | 370/218 |
| 2003/0235190 | A1 * | 12/2003 | Josyula et al. | 370/386 |

* cited by examiner

*Primary Examiner*—Hanh Nguyen
(74) *Attorney, Agent, or Firm*—Clements Bernard PLLC; Christopher L. Bernard; Tyler S. Brown

(57) ABSTRACT

The present invention combines switching and control functions on a single module while avoiding requirements to synchronize working and standby switch configuration information. The present invention eliminates the idea of redundant working and standby control/switching modules and instead, distributes the switching/control functions across two (primary and secondary) modules, where in the nominal (not failed) case the primary module contains the active control component and the secondary module contains the active switching component. In the failed case, both the switching and control functions reside on one module.

13 Claims, 42 Drawing Sheets

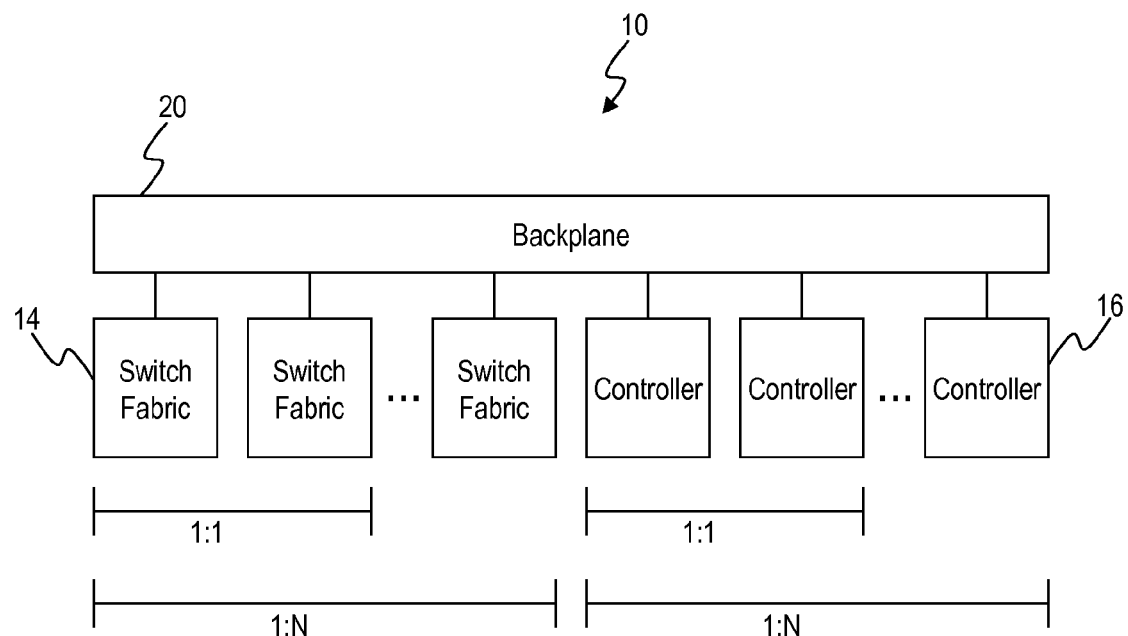
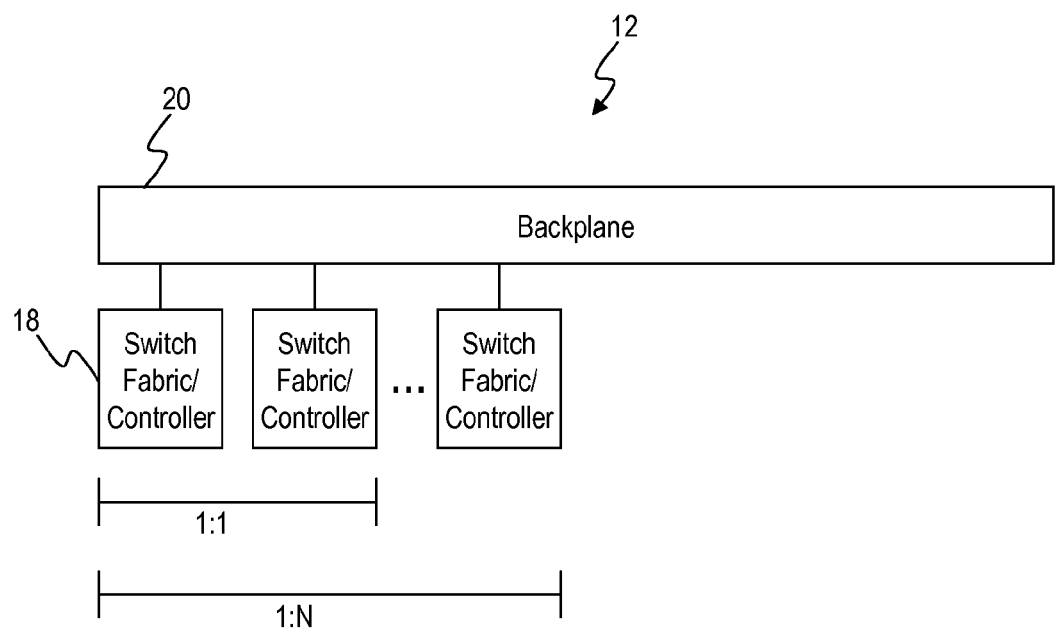
FIG. 1.  *Prior Art*

Card Status Signals

| Card State | Present | Card_Status[0] | Card_Status[1] |
|---|---|---|---|
| Slot Empty | False | Don't Care | Don't Care |
| Card seated, full reset recovery in progress or HW failure | True | 0 | 0 |
| Booting | True | 0 | 1 |
| Partial software available | True | 1 | 0 |
| Full software available | True | 1 | 1 |
| External reset complete | True | 0 | 0 |

*FIG. 8.*

T₀ Initial condition. Chassis power is off

T₁ Power on. CTX1 boots first, CTX2 reset held longer by hardware.

T₂ CTX1 becomes primary, CTX2 becomes secondary. Timing planes qualified and brought into service.

T₃ CTX2 TP, DP and PP qualified by FMF. DP and PP brought into service.

212

|     | CTX1 | CTX2 |   |   |   |   |   |   |
|-----|------|------|---|---|---|---|---|---|
| CP  | P    | X    | P | R | P | S | P | S |
| TP  | A    | X    | A | R | A | S | A | S |
| DP  | A    | X    | A | R | A | S | S | A |
| PP  | A    | X    | A | R | A | S | A | A |
|     | $T_0$ |     | $T_1$ |  | $T_2$ |  | $T_3$ |  |

$T_0$  Initial condition. CTX1 is primary. CTX2 slot 2 empty $T_1$  CTX2 inserted. Ejectors still open. Card held in reset $T_2$  Ejectors closed. CTX2 CPU boots, assumes secondary role. TP, DP and PP released from reset.

$T_3$  CTX2 TP, DP and PP qualified by FMF. DP and PP brought into service.

*FIG. 12.*

T₀  Initial condition. CTX1 is primary.

T₁  CTX2 is placed in admin lock. Only secondary CTX can be placed in admin lock. All traffic moved without interruption to CTX1.

T₂  Timing, data and packet planes are deactivated on CTX2.

216

|    | CTX1 | CTX2 | | SMx | | | | |
|----|------|------|---|-----|---|---|---|---|
| CP | P | S |   | P | S |   | P | S |   |
| TP | A | S |   | A | S |   | A | S |   |
| DP | S | A | A | A | A | S | A | A | D |
| PP | A | A | A | A | A | S | A | A | D |
|    | $T_0$ | | | $T_1$ | | | $T_2$ | | |

$T_0$    Initial condition. CTX1 is primary. SMx is in unlocked $T_1$    SMx is placed in admin lock. TDM traffic moved without interruption to CTX1. Packet traffic is re-routed away from SMx without interruption.

$T_2$    Data and packet planes are deactivated on SMx.

| | | | | | | | |
|---|---|---|---|---|---|---|---|
| CP | P | S | P | R | P | X | |
| TP | A | D | A | R | A | X | |
| DP | A | D | A | R | A | X | |
| PP | A | D | A | R | A | X | |
| | $T_0$ | | $T_1$ | | $T_2$ | | |

$T_0$  Initial condition. CTX1 is primary. CTX2 is admin locked.

$T_1$  Ejectors opened. All devices held in reset $T_2$  CTX2 is removed from chassis.

*FIG. 15.*

$T_0$  Initial condition. CTX1 is primary. SMx is admin locked.

$T_1$  Ejectors opened. All devices held in reset $T_2$  SMx is removed from chassis.

|     | CTX1 | | CTX2 | | | |
| --- | --- | --- | --- | --- | --- | --- |
| CP  | P | S | P | S | P | S |
| TP  | A | D | A | S | A | S |
| DP  | A | D | A | S | S | A |
| PP  | A | D | A | S | A | A |
|     | $T_0$ | | $T_1$ | | $T_2$ | |

$T_0$    Initial condition. CTX1 is primary. CTX2 is administratively locked $T_1$    TP, DP and PP released from locked mode.

$T_2$    CTX2 TP, DP and PP qualified by FMF. TP, DP and PP brought into service.

|    | CTX1 | CTX2 |   |   |   |   |   |   |   |
|----|------|------|---|---|---|---|---|---|---|
| CP | P    | S    | R | S | R | P | S | P | S | P |
| TP | A    | S    | R | S | R | A | S | A | S | A |
| DP | S    | A    | R | A | R | A | S | A | A | S |
| PP | A    | A    | R | A | R | A | S | A | A | A |
|    | $T_0$ |    | $T_1$ |   | $T_2$ |   | $T_3$ |   | $T_4$ |   |

$T_0$  Initial condition. CTX1 is primary.

$T_1$  Ejectors opened on CTX1. TDM and packet plane isolation procedures executed. CTX2 has not yet reacted.

$T_2$  CTX2 assumes primary role and moves all traffic to itself $T_3$  Ejectors closed. CTX1 CPU boots, assumes secondary role. TP, DP and PP released from reset.

$T_4$  CTX1 TP, DP and PP qualified by FMF. TP, DP and PP brought into service.

|    | CTX1 | CTX2 |   |   |   |   |   |   |
|----|------|------|---|---|---|---|---|---|
| CP | P    | S    | P | S | P | R | P | X |
| TP | A    | S    | A | S | A | R | A | X |
| DP | S    | A    | A | D | A | R | A | X |
| PP | A    | A    | A | D | A | R | A | X |
|    | $T_0$ |     | $T_1$ |  | $T_2$ |  | $T_3$ |  |

$T_0$   Initial condition. CTX1 is primary.

$T_1$   Ejectors opened on CTX2. CTX1 received interrupt via Serial PIF and has recomputed switch fabric[1]. TDM and packet plane isolation procedures executed.

$T_2$   After 50 ms, CTX2 is fully reset.

$T_3$   CTX2 is extracted

[1] Recomputation of switch fabric in time to avoid traffic hit cannot be guaranteed.

|     | CTX1 | CTX2 |   |   |   |   |   |   |
|-----|------|------|---|---|---|---|---|---|
| CP  | P    | S    | U | P | P | U | P | S |
| TP  | A    | S    | A | S | A | S | A | S |
| DP  | S    | A    | S | A | S | A | S | A |
| PP  | A    | A    | A | A | A | A | A | A |
|     | $T_0$ |    | $T_1$ |  | $T_2$ |  | $T_3$ |  |

$T_0$  Initial condition. CTX1 is primary and has received and processed new load image.

$T_1$  CTX1 reboots and starts to run new load. CTX2 switches to primary and starts to run SSMs. Switch core has not yet recomputed TDM fabric. Timing plane management hasn't switched primary timing source.

$T_2$  CTX1 resets control planes on all other cards, including CTX2. CTX1 starts to run SSMs.

$T_3$  CTX2 boots into secondary state. CTX1 finishes SSMs and recomputes switch fabric back to original configuration.

*FIG. 20.*

|    | CTX1 | CTX2 | CTX1 | CTX2 | CTX1 | CTX2 | CTX1 | CTX2 | CTX1 | CTX2 | CTX1 | CTX2 |
|----|------|------|------|------|------|------|------|------|------|------|------|------|
| CP | P | S | U | P | U | P | P | U | P | U | P | S |
| TP | A | S | A | S | S | A | S | A | A | S | A | S |
| DP | S | A | S | A | A | S | A | S | S | A | S | A |
| PP | A | A | A | A | A | A | A | A | A | A | A | A |
|    | $T_0$ | | $T_1$ | | $T_2$ | | $T_3$ | | $T_4$ | | $T_5$ | |

$T_0$  Initial condition. CTX1 is primary and has received and processed new load image.

$T_1$  CTX1 reboots and starts to run new load. CTX2 switches to primary and starts to run SSMs. Switch core has not yet recomputed TDM fabric. Timing plane management hasn't switched primary timing source.

$T_2$  CTX2 SSMs complete. FMF has validated CTX1 TDM and packet planes and switch core computes new TDM fabric $T_3$  CTX1 resets control planes on all other cards, including CTX2. CTX1 starts to run SSMs.

$T_4$  CTX1 finishes SSMs and recomputes switch fabric back to original configuration. CTX1 becomes primary timing source.

$T_5$  CTX2 finishes booting and becomes secondary

|    | CTX1 | CTX2 |   |   |   |   |
|----|------|------|---|---|---|---|
| CP | P    | S    | X | S | X | P |
| TP | A    | S    | X | S | X | A |
| DP | S    | A    | X | A | X | A |
| PP | A    | A    | X | A | X | A |
|    | $T_0$ |     | $T_1$ |  | $T_2$ |  |

$T_0$  Initial condition. CTX1 is primary $T_1$  CTX1 full power failure. Data plane not affected. Some packet plane traffic briefly affected. Timing plane switches cleanly.

$T_2$  CTX2 becomes primary. CTX2 timing plane becomes primary.

|    | CTX1 | CTX2 |   |   |   |   |
|----|------|------|---|---|---|---|
| CP | P    | S    | P | X | P | X |
| TP | A    | S    | A | X | A | X |
| DP | S    | A    | S | X | A | X |
| PP | A    | A    | A | X | A | X |

$T_0$ $\qquad$ $T_1$ $\qquad$ $T_2$ $T_0$  Initial condition. CTX1 is primary $T_1$  CTX2 full power failure. Some packet plane traffic briefly affected. Some data plane traffic affected.

$T_2$  CTX1 reprograms ingress, egress and center stages to use CTX1 data plane.

*FIG. 23.*

|    | CTX1 | CTX2 | CTX1 | CTX2 | CTX1 | CTX2 | CTX1 | CTX2 | CTX1 | CTX2 |
|----|------|------|------|------|------|------|------|------|------|------|
| CP | P    | S    | B    | S    | B    | P    | B    | P    | S    | P    |
| TP | A    | S    | A    | S    | S    | A    | S    | A    | S    | A    |
| DP | S    | A    | S    | A    | S    | A    | A    | S    | A    | S    |
| PP | A    | A    | A    | A    | A    | A    | A    | A    | A    | A    |
|    | $T_0$ |     | $T_1$ |     | $T_2$ |     | $T_3$ |     | $T_4$ |     |

$T_0$ Initial condition. CTX1 is primary $T_1$ CTX1 software failure. Detected via CTX_Status and CTX_Primary as well as beacon loss.

$T_2$ CTX2 software moves to primary and begins initialization and SSMs.

$T_3$ CTX2 requalfies DP and PP on CTX1 and reprograms switch fabric to move TDM traffic to CTX1.

$T_4$ CTX1 comes up in secondary state

|     | CTX1 | CTX2 |   |   |   |   |
|-----|------|------|---|---|---|---|
| CP  | P    | S    | P | B | P | S |
| TP  | A    | S    | A | S | A | S |
| DP  | S    | A    | S | A | S | A |
| PP  | A    | A    | A | A | A | A |
|     | $T_0$ |     | $T_1$ |  | $T_2$ |  |

$T_0$ Initial condition. CTX1 is primary.

$T_1$ CTX2 software failure. No indication of TP, DP or PP failure from DPFI/TPFI. Primary CTX does not react.

$T_2$ CTX2 returns to secondary role.

FIG. 25.

|     | CTX1 | CTX2 |   |   |   |   |   |   |   |   |   |
|-----|------|------|---|---|---|---|---|---|---|---|---|
| CP  | P    | S    | B | S | B | P | B | P | F | P | F | P |
| TP  | A    | S    | A | S | S | A | S | A | S | A | R | A |
| DP  | S    | A    | S | A | S | A | A | S | S | A | R | A |
| PP  | A    | A    | A | A | A | A | A | A | S | A | R | A |
|     | $T_0$ |     | $T_1$ |   | $T_2$ |   | $T_3$ |   | $T_4$ |   | $T_5$ |   |

$T_0$  Initial condition. CTX1 is primary $T_1$  CTX1 software failure. Detected via CTX_Status, CTX_Primary and beacon loss.

$T_2$  CTX2 software jumps to primary and begins initialization and SSMs.

$T_3$  CTX2 requalifies TP, DP and PP on CTX1 and reprograms switch fabric to move TDM traffic to CTX1.

$T_4$  CTX1 fails to recover after *TBD* minutes. CPFI fails the card. TDM and PP traffic moved off CTX1.

$T_5$  CTX1 is given a momentary master reset. Control plane does not recover and TP, DP and PP remain in reset.

|    | CTX1 | CTX2 |     |   |   |   |     |   |
|----|------|------|-----|---|---|---|-----|---|
| CP | P    | S    | P+F | S | B | P | S+F | P |
| TP | A    | S    | A   | S | R | S | R   | A |
| DP | S    | A    | S   | A | R | A | R   | A |
| PP | A    | A    | A   | A | R | A | R   | A |
|    | $T_0$ |     | $T_1$ |  | $T_2$ | | $T_3$ | |

$T_0$ Initial condition. CTX1 is primary $T_1$ CTX1 detects Ethernet switch or connectivity failure and raises RUP. If CTX1 cannot determine that CTX2 is ready to take over, scenario ends. Otherwise, CTX1 detects CTX2 has good status (via Card_Status or current arbitration beacons).

$T_2$ CTX1 master resets itself and CTX2 and becomes primary.

$T_3$ CTX1 TP, DP and PP are left in reset.

FIG. 27.

|    | CTX1 | CTX2 |   |   |   |   |   |   |
|----|------|------|---|---|---|---|---|---|
| CP | P    | S    | P | S+F | P | R | P | S+F |
| TP | A    | S    | A | S   | A | R | A | R   |
| DP | S    | A    | S | A   | A | R | A | R   |
| PP | A    | A    | A | A   | A | R | A | R   |
|    | $T_0$ |     | $T_1$ |  | $T_2$ |  | $T_3$ |  |

$T_0$  Initial condition. CTX1 is primary $T_1$  CTX2 detects Ethernet switch or connectivity failure. If CTX2 can still communicate to CTX1, it reports failure to CTX1. If CTX1 cannot communicate with CTX2, it assumes failure on CTX2. RUP raised against CTX2.

$T_2$  DP and PP traffic moved off CTX2 and then CTX2 is momentarily fully reset by CTX1.

$T_3$  CTX2 becomes secondary. TP, DP and PP are left in reset.

|    | CTX1 | CTX2 |     |   |   |   |     |   |
|----|------|------|-----|---|---|---|-----|---|
| CP | P    | S    | P+F | S | B | P | S+F | P |
| TP | A    | S    | A   | S | R | S | R   | A |
| DP | S    | A    | S   | A | R | A | R   | A |
| PP | A    | A    | A   | A | R | A | R   | A |
|    | $T_0$ |     | $T_1$ |  | $T_2$ |  | $T_3$ |  |

$T_0$ Initial condition. CTX1 is primary $T_1$ CTX1 isolates a serial PIF fault to itself. If possible, PP traffic is migrated off CTX1.

$T_2$ CTX1 master resets itself and CTX2 and becomes primary.

$T_3$ CTX1 TP, DP and PP are left in reset.

|  | CTX1 | CTX2 |  |  |  |  |  |  |
|----|----|----|----|----|----|----|----|----|
| CP | P | S | P | S+F | P | R | P | S+F |
| TP | A | S | A | S | A | R | A | R |
| DP | S | A | S | A | A | R | A | R |
| PP | A | A | A | A | A | R | A | R |
|  | $T_0$ |  | $T_1$ |  | $T_2$ |  | $T_3$ |  |

$T_0$  Initial condition. CTX1 is primary $T_1$  PIF fault isolated to CTX2.

$T_2$  DP and PP traffic moved off CTX2 and then CTX2 is momentarily fully reset by CTX1.

$T_3$  CTX2 becomes secondary. TP, DP and PP are left in reset.

|     | CTX1 | CTX2 | | SMx | | | | | |
|-----|------|------|---|-----|---|---|---|---|---|
| CP  | P    | S    |   | P   | S | F | P | S | R |
| TP  | A    | S    |   | A   | S |   | A | S |   |
| DP  | S    | A    | A | A   | A | S | A | A | R |
| PP  | A    | A    | A | A   | A | S | A | A | R |
|     | $T_0$ | | | $T_1$ | | | $T_2$ | | |

$T_0$ Initial condition. CTX1 is primary $T_1$ CPFI isolates PIF fault to SMx, downstream TSX and FAP do not detect errors. DP and PP traffic moved to CTX1.

$T_2$ SMx is held in reset.

*FIG. 31.*

|    | CTX1 | CTX2 |   |   |   |   |   |   |   |   |   |   |
|----|------|------|---|---|---|---|---|---|---|---|---|---|
| CP | P    | S    | P | S | P | S | R | S | B | P | S | P |
| TP | A    | S    | D | S | D | S | R | S | R | A | R | A |
| DP | S    | A    | S | A | S | A | R | A | R | A | R | A |
| PP | A    | A    | A | A | S | A | R | A | R | A | R | A |
|    | $T_0$ |     | $T_1$ |  | $T_2$ |  | $T_3$ |  | $T_4$ |  | $T_5$ |  |

$T_0$  Initial condition. CTX1 is primary $T_1$  Timing fault detected. Outputs deactivated $T_2$  CTX1 raises RUP on itself. Moves all traffic off itself $T_3$  CTX1 master resets itself.

$T_4$  CTX2 becomes primary after reset of CTX1. CTX1 is booting.

$T_5$  CTX1 becomes secondary, but does not re-enable TP, DP or PP due to fault condition.

|     | CTX1 | CTX2 |   |   |   |   |   |   |   |   |
|-----|------|------|---|---|---|---|---|---|---|---|
| CP  | P    | S    | P | S | P | S | P | R | P | S |
| TP  | A    | S    | A | D | A | D | A | R | A | R |
| DP  | S    | A    | S | A | A | S | A | R | A | R |
| PP  | A    | A    | A | A | A | S | A | R | A | R |
|     | $T_0$ |     | $T_1$ |   | $T_2$ |   | $T_3$ |   | $T_4$ |   |

$T_0$  Initial condition. CTX1 is primary $T_1$  Timing fault detected on CTX2. RUP raised by CTX1 against CTX2.

$T_2$  DP and PP traffic is removed in controlled fashion from CTX2.

$T_3$  CTX2 is momentarily fully reset by CTX1

$T_4$  CTX2 returns to secondary state. TP, DP and PP are left in reset

|    | CTX1 | CTX2 |   |   |   |   |   |   |   |   |   |   |
|----|------|------|---|---|---|---|---|---|---|---|---|---|
| CP | P    | S    | P | S | P | S | R | S | B | P | S | P |
| TP | A    | S    | A | S | A | S | R | S | R | S | R | A |
| DP | S    | A    | D | A | R | A | R | A | R | A | R | A |
| PP | A    | A    | A | A | A | A | R | A | R | A | R | A |
|    | $T_0$ |     | $T_1$ |   | $T_2$ |   | $T_3$ |   | $T_4$ |   | $T_5$ |   |

$T_0$  Initial condition. CTX1 is primary $T_1$  DPFI detects fault in CTX1 data plane and convicts center stage. CTX1 raises RUP against itself. Traffic not affected. Begins requalification process.

$T_2$  Requalification of DP fails. DPFI resets data plane on CTX1.

$T_3$  Knowing that CTX2 is good, CTX1 master resets itself $T_4$  CTX2 becomes primary after reset of CTX1. CTX1 is booting.

$T_5$  CTX2 moves timing to CTX1; Does not re-enable TP, DP or PP on CTX1

|    | CTX1 | CTX2 |   |   |   |   |   |   |   |
|----|------|------|---|---|---|---|---|---|---|
| CP | P    | S    | P | S | P | S | P | R | P | S |
| TP | A    | S    | A | S | A | S | A | R | A | R |
| DP | S    | A    | A | D | A | R | A | R | A | R |
| PP | A    | A    | A | A | A | A | A | R | A | R |
|    | $T_0$ |     | $T_1$ |  | $T_2$ |  | $T_3$ |  | $T_4$ |  |

$T_0$  Initial condition. CTX1 is primary $T_1$  DPFI detects fault in CTX2 data plane and convicts center stage. Traffic possibly hit until switch fabric reprogrammed. CTX1 raises RUP against CTX2. Begins requalification process.

$T_2$  Requalification of DP fails. DPFI resets dataplane on CTX2.

$T_3$  CTX2 is momentarily master reset by CTX1.

$T_4$  CTX2 becomes secondary again, but TP, DP and PP are left in reset.

*FIG. 35.*

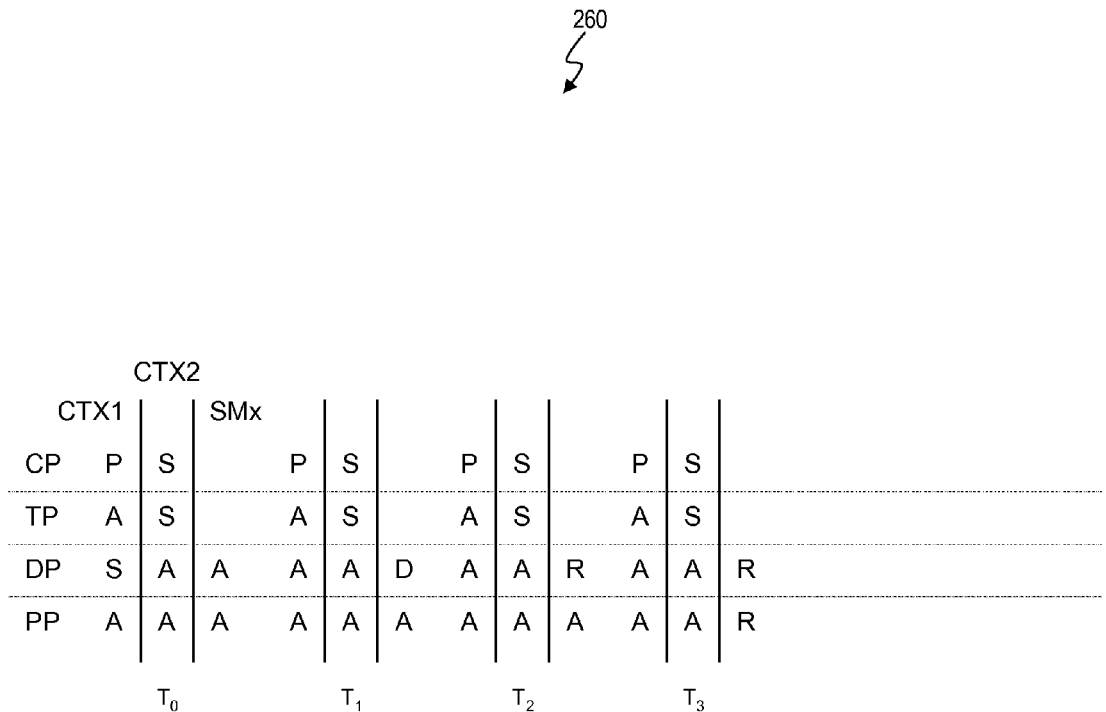

$T_0$ Initial condition. CTX1 is primary $T_1$ DPFI detects fault in SMx data plane and convicts center stage. Traffic possibly hit until switch fabric reprogrammed. CTX1 raises RUP against SMx. Begins requalification process.

$T_2$ Requalification of DP on SMx fails. SMx DP isolated. Traffic removed from PP on SMx.

$T_3$ SMx held in reset. (Capability exists to release SMx from reset but leave DP and PP in reset, allowing diagnostic access.)

|    | CTX1 | CTX2 |   |   |   |   |   |   |   |   |
|----|------|------|---|---|---|---|---|---|---|---|
| CP | P    | S    | P | S | P | S | R | S | S | P |
| TP | A    | S    | A | S | A | S | R | S | R | A |
| DP | S    | A    | S | A | S | A | R | A | R | A |
| PP | A    | A    | D | A | R | A | R | A | R | A |
|    | $T_0$ |     | $T_1$ | | $T_2$ | | $T_3$ | | $T_4$ | |

$T_0$    Initial condition. CTX1 is primary $T_1$    Packet Plane fault detected. Packet traffic removed from this device. RUP raised by CTX1 against itself. Begins requalification process.

$T_2$    Packet Plane requalification fails. DPFI resets packet plane on CTX1.

$T_3$    CTX1 master resets itself.

$T_4$    CTX2 becomes primary after reset of CTX1. Timing plane on CTX2 becomes active. TP, DP and PP on CTX1 left in reset.

*FIG. 37.*

|    | CTX1 | CTX2 |   |   |   |   |   |   |   |
|----|------|------|---|---|---|---|---|---|---|
| CP | P    | S    | P | S | P | S | P | R | P | S |
| TP | A    | S    | A | S | A | S | A | R | A | R |
| DP | S    | A    | S | A | S | A | A | R | A | R |
| PP | A    | A    | A | D | A | R | A | R | A | R |
|    | $T_0$ |    | $T_1$ |   | $T_2$ |   | $T_3$ |   | $T_3$ |   |

$T_0$ Initial condition. CTX1 is primary.

$T_1$ Packet Plane fault detected on CTX2. Packet traffic removed from this device. RUP raised by CTX1 against CTX2. Begins requalification process.

$T_2$ Packet Plane requalification fails. DPFI resets packet plane.

$T_3$ DP moved from CTX2 to CTX1. Then CTX2 is momentarily reset by CTX1.

$T_4$ CTX2 returns to secondary role. TP, DP and PP are not released from reset.

|    | CTX1 | CTX2 | SMx |   |   |   |   |   |   |   |   |   |   |
|----|------|------|-----|---|---|---|---|---|---|---|---|---|---|
| CP | P    | S    |     | P | S |   | P | S |   | P | S |   | P | S |
| TP | A    | S    |     | A | S |   | A | S |   | A | S |   | A | S |
| DP | S    | A    | A   | S | A | A | S | A | A | A | A | R | A | A | R |
| PP | A    | A    | A   | A | A | D | A | A | R | A | A | R | A | A | R |

$T_0$    $T_1$    $T_2$    $T_3$    $T_4$ $T_0$   Initial condition. CTX1 is primary $T_1$   DPFI detects fault in SMx packet plane and convicts center stage. Traffic possibly hit until reachabilty changes propagate and output queues drain. CTX1 raises RUP against SMx. Begins requalification process.

$T_2$   Requalification of PP on SMx fails. PP is reset.

$T_3$   Traffic removed from DP on SMx to CTX1. SMx is momentarily reset.

$T_4$   DP and PP on SMx are left in reset.

|    | CTX1 | CTX2 |   |   |   |   |   |   |
|----|------|------|---|---|---|---|---|---|
| CP | P    | S    | X | S | X | P | X | P |
| TP | A    | D    | X | D | X | D | X | A |
| DP | A    | D    | X | D | X | D | X | A |
| PP | A    | D    | X | D | X | D | X | A |
|    | $T_0$ |     | $T_1$ |   | $T_2$ |   | $T_3$ |   |

$T_0$  Initial condition. CTX1 is primary, CTX2 is admin locked $T_1$  Primary CTX catastrophic failure (pulled, PSU failure, rolling reboot). Traffic on CTX1 dropped.

$T_2$  CTX2 must assume primary role to grab DCN links and report alarms.

$T_3$  CTX2 admin state is autonomously unlocked by CPFI. Traffic is restored. No provisioning is lost.

|    | CTX1 | CTX2 |   |   |   |   |   |   |
|----|------|------|---|---|---|---|---|---|
| CP | P    | S    | X | S | X | B | X | P |
| TP | A    | R    | X | R | X | R | X | A |
| DP | A    | R    | X | R | X | R | X | A |
| PP | A    | R    | X | R | X | R | X | A |
|    | $T_0$ |     | $T_1$ |  | $T_2$ |  | $T_3$ |  |

$T_0$    Initial condition. CTX1 is primary, CTX2 has RUP due to timing plane failure $T_1$    Primary CTX catastrophic failure (pulled, PSU failure, rolling reboot). Traffic on CTX1 dropped.

$T_2$    CTX2 clears any equipment faults and reboots itself $T_3$    CTX2 comes up in primary state, TP, DP and PP are returned to service. Faults may or may not be rediscovered.

|    | CTX1 | CTX2 |    |    |    |    |    |    |    |    |    |    |    |    |    |
|----|------|------|----|----|----|----|----|----|----|----|----|----|----|----|-----|
|    |      | LMx  |    |    |    |    |    |    |    |    |    |    |    |    |    |
| CP | P | S | P | P | S | P | P | S | P | R | P | P | S | P | P |
| TP | A | S |   | A | S |   | D | S |   | R | S |   | R | A |   |
| DP | S | A | A | S | A | D | S | A | D | R | A | A | R | A | A |
| PP | A | A | A | A | A | A | A | A | A | R | A | A | R | A | A |
|    | $T_0$ |  |  | $T_1$ |  |  | $T_2$ |  |  | $T_3$ |  |  | $T_4$ |  |  |

$T_0$  Initial condition. CTX1 is primary.

$T_1$  DPFI detects fault in TDM plane and convicts LMx. CTX1 raises RUP against LMx. Traffic partially affected. Begins requalification process.

$T_2$  Within TBD ms, timing plane fault detected on CTX1. RUP lowered for LMx. RUP raised for CTX1.

$T_3$  Mitigation of TDM traffic on LMx reversed. CTX1 master resets itself. CTX2 becomes primary. TP, DP and PP on CTX1 are left in reset.

$T_4$  Active TP on CTX2, secondary CP for CTX1

*FIG. 42.*

SYSTEM AND METHODS FOR REDUNDANT SWITCH FABRIC AND SWITCH CONTROLLER

FIELD OF THE INVENTION

The present invention relates generally to communication networks, and more particularly, to systems and methods for a redundant switch fabric and switch controller module which combines switching and control functions on a single module while avoiding requirements to synchronize working and standby switch configuration information.

BACKGROUND OF THE INVENTION

Network elements in data and telecommunications systems typically include multiple interconnected modules or line cards, such as through a backplane, a mid-plane, or the like. Network operators add modules as required for increased capacity or features. Typically, all network elements require a controller module which generally provides operations, administration, maintenance, and provisioning (OAM&P) of modules within the network element. The controller module can also include a data communications channel to a network and to an element management system (EMS) and the like. In a switch network element, such as an optical switch, Ethernet switch, SONET/SDH switch, and the like, there is also typically a switch fabric module configured to provide switching between line modules, port modules, or the like.

Switching systems and network elements typically require redundant, replaceable equipment for controller and switch fabric modules. This is required to provide carrier-grade performance and reliability, i.e. to ensure network element operation without a single point of failure and to provide system availability above 99.999% or more as required. Traditionally, controller and switch fabric modules are deployed with redundancy, such as with a 1:1 protection (working plus protect) or a 1:N (one protect for N working). Note, in protection schemes, protect is also referred to as standby or secondary, and working is also referred to a primary or active.

Referring to FIG. 1, a block diagram illustrates two conventional protection mechanisms 10,12 for switch fabric modules 14, controller modules 16, and combined switch fabric/controller modules 18. In these examples, all of the modules 14,16,18 are interconnected through a backplane 20. Alternatively, these modules 14,16,18 could be interconnected through other mechanisms as are known in the art. The protection mechanism 10 includes 1:1 or 1:N switch fabric modules 14 and 1:1 or 1:N controller modules 16, i.e. switch fabric and controller modules are separate modules. Here, there is a separate working and protect module (or N working for one protect) for each of the switching and control functionality. The mechanism 10 provides full redundancy, but requires a large number of replaceable modules increasing cost and utilizing excess space on the backplane 20. For example, a 1:1 scenario here requires four modules which in a network element shelf could occupy four slots which could be instead utilized for traffic carrying modules.

The protection mechanism 12 includes 1:1 or 1:N switch fabric/controller modules 16 which combine both the switching and control functionality. This combination of functionality reduces the required space. However, when one of the modules 16 fails, it can result in a double failure losing both switching and control functions. In this case, the switch configuration information must be persisted on the standby control component so that the standby fabric can be rapidly configured. This requires updating the standby control component whenever a switch configuration change takes place on the working module—i.e. the standby control component must be kept in-synch with the working control component. This can introduce design complexity and the risk that the working and standby become out of synch leading to a traffic loss on a protection switch.

BRIEF SUMMARY OF THE INVENTION

In various exemplary embodiments, the present invention combines switching and control functions on a single module while avoiding requirements to synchronize working and standby switch configuration information. The present invention eliminates the idea of redundant working and standby control/switching modules, and instead, distributes the switching/control functions across two (primary and secondary) modules, where in the nominal (not failed) case, the primary module contains the active control component and the secondary module contains the active switching component. In the failed case, both the switching and control functions reside on one module.

In an exemplary embodiment of the present invention, a chassis with a redundant switch fabric and switch controller module includes a first module including a first switch fabric and a first control system, and a second module including a second switch fabric and a second control system, wherein the first module is configured to provide primary control functions and standby switch fabric functions, and the second module is configured to provide primary switch fabric functions and standby control functions. Optionally, the first module and the second module interconnect through a processor interface bus system. Switch configuration information for the second switch fabric is stored in the first control system, wherein responsive to a failure on the first module, the primary control functions switch to the second control system and the primary switch fabric experiences no traffic interruption, and responsive to a failure on the second module, the primary switch fabric switches to the standby switch fabric which utilizes the switch configuration information in the first control system to update the first switch fabric.

The first switch fabric includes a first data plane and a first packet plane, the second switch fabric includes a second data plane and a second packet plane, and the first data plane and the second data plane are configured to switch time division multiplexed traffic, and wherein the first packet plane and the second packet plane are configured to switch Ethernet traffic. The first control system includes a first control plane and a first timing plane, and the second control system includes a second control plane and a second control plane. In normal operating conditions the first control plane is active and the second control plane is standby, the first timing plane is active and the second timing plane is standby, the second data plane is active and the first data plane is standby, and both the first packet plane and the second packet plane are active, and the first module and second module include arbitration mechanisms configured to provide redundancy in a failure event on one of the first module and the second module. Optionally, the arbitration mechanisms are configured to isolate the failure event and to provide a reset to clear the failure, and if the reset does not clear the failure, the arbitration mechanisms reset one of the first module and the second module with the failure event while maintaining one of the first control plane and the second control plane as standby.

Optionally, the chassis further includes a third module including a third switch fabric, wherein the third switch fabric includes a third data plane and a third packet plane, the third module interconnects to the first module and the second module through the processor interface bus system, and the arbitration mechanisms are further configured to provide redundancy on one of the first module and the second module in a failure event on the first module. The arbitration mechanisms includes redundancy rules for each of the first control plane, the second control plane, the first timing plane, the second timing plane, the first data plane, the second data plane, the third data plane, the first packet plane, the second packet plane, and the third packet plane. Alternatively, the chassis further includes a line module including an ingress and egress switch fabric, wherein the line module is interconnected to the first module and the second module, wherein the line module, the first module, and the second module include a three stage Clos switch.

In another exemplary embodiment of the present invention, a method for redundant switch fabric and switch controller modules includes operating a primary control system on a first module and a primary switch fabric on a second module, wherein the first module and the second module are interconnected, and wherein the primary control system is configured to control the primary switch fabric, exchanging status messages between the first module and the second module, experiencing a failure event on one of the first module and the second module, switching from the primary control system to a standby control system on the second module if the failure event is on the first module, and switching from the primary switch fabric to a standby switch fabric on the second module if the failure event is on the second module.

Optionally, the method further includes requalifying a subsystem on one of the first module and second module corresponding to the failure event, setting one of the first module and second module corresponding to the failure event to the standby control system if the requalification fails and placing the switch module in reset, and switching back if the requalification succeeds. Alternatively, the method further includes operating an expansion switch fabric on a third module, wherein the third module is interconnected with the first module and the second module, exchanging status messages between the third module and the primary control system, experiencing a failure event on the third module, and switching from the expansion switch fabric to the standby switch fabric.

The primary control system can include a primary control plane and a primary timing plane, the standby control system can include a standby control plane and a standby timing plane, the primary switch fabric can include a primary data switch fabric for time division multiplexed traffic and a primary packet switch fabric for Ethernet traffic, and the standby switch fabric can include a standby data switch fabric for time division multiplexed traffic and a standby packet switch fabric for Ethernet traffic. Optionally, the method further includes operating a line module including an ingress switch fabric, an egress switch fabric, and a client interface, wherein the line module, the first module, and the second module includes a three stage Clos switch, and the three-stage Clos switch includes a redundant switch controller and switch fabric module in two modules.

In yet another exemplary embodiment of the present invention, a network element with redundant switch fabric and switch controller modules includes a first module including a first control plane, a first timing plane, a first data switch plane, and a first packet switch plane; a second module including a second control plane, a second timing plane, a second data switch plane, and a second packet switch plane; an interconnection between the first module and the second module; and redundancy means for operating the first control plane and the first timing plane as primary and the second control plane and the second timing plane as standby, and for operating the second data plane as active and the first data plane as standby, wherein the first packet switch plane and the second packet switch plane both operate as active. Optionally, the network element further includes messaging means for providing module status between the first and second module.

Alternatively, the network element further includes failure recovery means for switching between primary and standby between the first and second control plane, the first and second timing plane, and the first and second data switch plane responsive to a failure event, and failure recovery means for switching packet traffic to one of the first packet switch plane and the second packet switch plane responsive to a failure event. Optionally, the network element further includes a third switch module including an expansion data switch plane and an expansion packet switch plane, wherein the third switch module is interconnected to the first switch module and the second switch module, and redundancy means for operating the expansion data switch plane as active and one of the first data switch plane and the second data switch plane as standby, and for operating the expansion switch packet plane as active and one of the first packet switch plane and the second packet switch plane as standby. The network element can further include failure recovery means for switching the expansion data switch plane and the expansion packet switch plane responsive to a failure event. Optionally, the network element further includes a line module including an ingress switch, an egress switch, and one or more client interfaces, wherein the line module, the first module, and the second module include a three-stage Clos switch, and the three-stage Clos switch includes a redundant switch controller and switch fabric module in two modules.

BRIEF DESCRIPTION OF THE DRAWINGS

The present invention is illustrated and described herein with reference to the various drawings, in which like reference numbers denote like method steps and/or system components, respectively, and in which:

FIG. 1 is a block diagram illustrating two conventional protection mechanisms for switch fabric modules, controller modules, and combined switch fabric/controller modules;

FIG. 8 is a card status table illustrating possible states for each of the CTX modules according to an exemplary embodiment of the present invention;

FIGS. 10-42 are tables illustrating various operational scenarios and the associated functions of the control (CP), timing (TP), TDM (DP), and packet (PP) planes according to exemplary embodiments of the present invention.

DETAILED DESCRIPTION OF THE INVENTION

In various exemplary embodiments, the present invention combines switching and control functions on a single module while avoiding requirements to synchronize working and standby switch configuration information. The present invention eliminates the idea of redundant working and standby control/switching modules, and instead, distributes the switching/control functions across two (primary and secondary) modules, where in the nominal (not failed) case, the primary module contains the active control component and the secondary module contains the active switching component. In the failed case, both the switching and control functions reside on one module.

Figure 2:
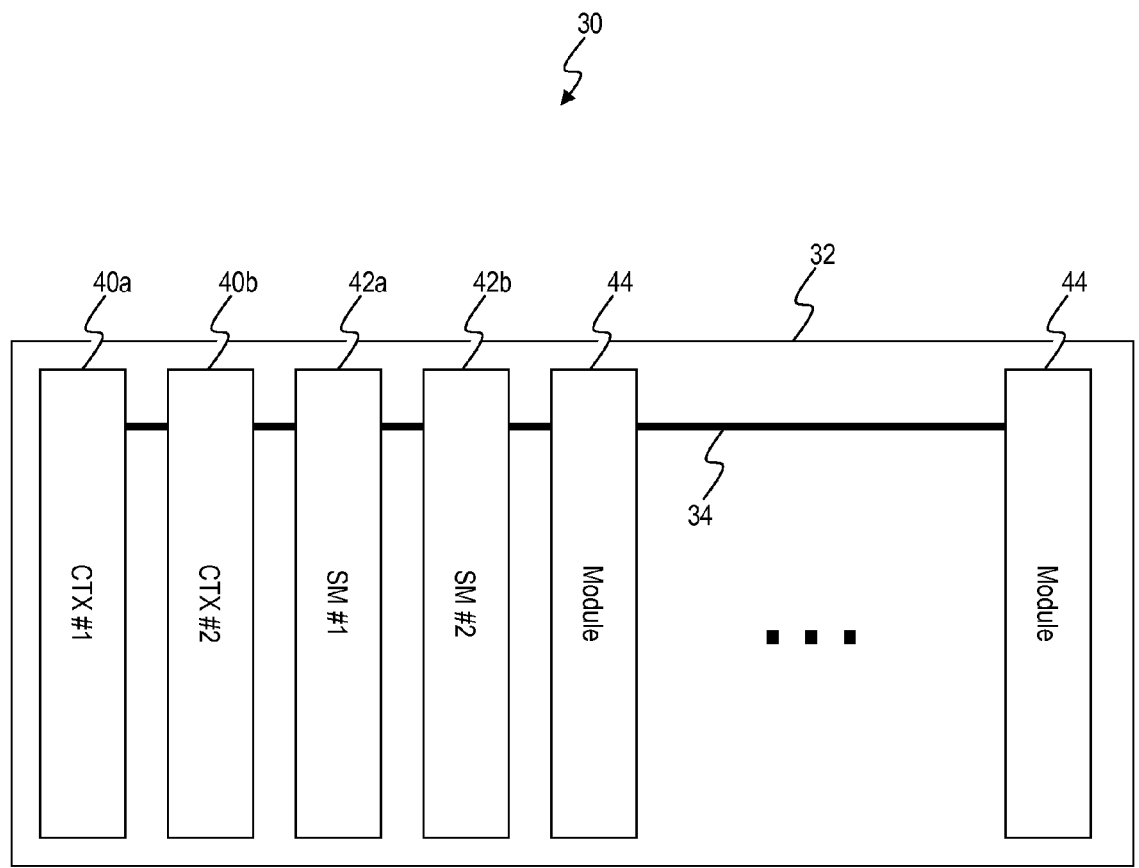
FIG. 2 is a switch network element (NE) with combined switching and control functions according to an exemplary embodiment of the present invention.

Referring to FIG. 2, a switch network element (NE) 30 is illustrated with combined switching and control functions according to an exemplary embodiment of the present invention. The NE 30 can include a shelf 32 with a backplane 34 used to connect a plurality of modules in the shelf 32. Note, the shelf 32 can also be referred to as a chassis. The plurality of modules can include Control, Timing, and Switch (hereinafter referred to as "CTX" for control, timing, and switch) modules 40a,40b, switch modules ("SMs") 42a,42b, and line modules ("LMs") 44. The CTX modules 40a,40b include combined control, switching, and timing functionality. The SMs 42a,42b include only switching functionality. The SMs 42a,42b can be utilized to expand the switch fabric size of the NE 30 beyond two CTXs 40a,40b. The line modules ("LMs") 44 are configured to interface to clients at a variety of interfaces including SONET/SDH, Optical Transport Network (OTN), Ethernet, and the like. For example, additional modules can be added to the shelf 32 to support more LMs 44. Additionally, the NE 30 can include multiple shelves 32 in an interconnected fashion to support a large switch element.

In an exemplary embodiment, the NE 30 provides a three-stage Clos switch fabric with the ingress and egress stage of the switch fabric residing on the LMs 44 and the center stage resides on the combined switching/control CTX modules 40a,40b and the SMs 42a,42b. The NE 30 can be deployed in various configurations based on traffic requirements. For example, only two CTX modules 40a,40b are required in a low capacity configuration to provide 1:1 redundancy. In this configuration, only two modules are required to provide 1:1 redundancy both in switching and control for the NE 30. For additional capacity, the SMs 42a,42b can be added to provide an increased switch core. For example, one SM 42a with the CTXs 40a,40b could provide 1:2 redundancy, and both SMs 42a,42b could provide 1:3 redundancy, etc.

In an exemplary embodiment of the present invention, one of the two CTX modules 40a,40b is selected to be the primary and is in control of configuration of the switch fabric. The present invention distributes the switching and control functions across both the CTX modules 40a,40b using serial bus arbitration mechanisms. Traditionally, the active switching fabric is on the primary module. In the present invention, the active fabric is on the secondary CTX module 40b which is standby from a control perspective, but active from a switch fabric perspective. If the primary CTX module 40a fails, the secondary CTX 40b takes over as the primary, but it does not need to come up in context with the reset of the NE 30 in order to provision the switch fabric slice on this card. Instead, it is already configured. If the secondary module fails, the primary is fully in context (as the primary control module) and can rapidly provision its fabric to start using the slice located on it.

The NE 30 of FIG. 2 is described herein as an exemplary illustration of the present invention. Those of ordinary skill in the art will recognize the present invention can equally apply to any NE configuration with switch and control modules as a mechanism to provide full redundancy while combining module functionality.

Figure 3:
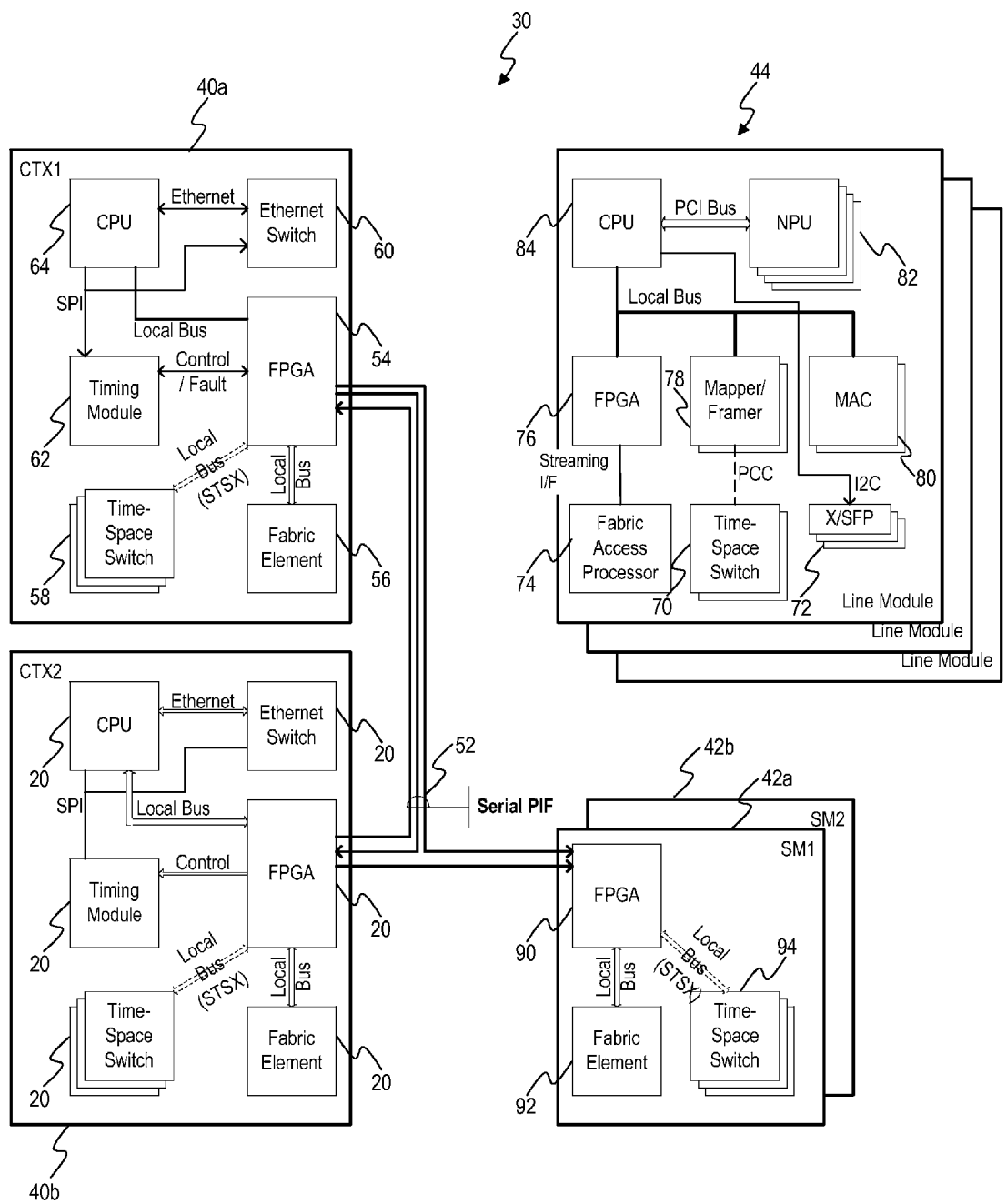
FIG. 3 is a block diagram illustrating details of the modules in the switch NE of FIG. 2 according to an exemplary embodiment of the present invention.

Referring to FIG. 3, details of the modules 40a,40b,42a, 42b,44 in the switch NE 30 of FIG. 2 are illustrated according to an exemplary embodiment of the present invention. The NE 30 is configured to provide switching of both layer one (e.g., SONET/SDH/OTN) and layer two data (e.g., Ethernet). As described herein, the NE 30 can operate with only the CTX modules 40a,40b in a low-capacity configuration, and can add switch fabric capacity by adding SMs 42a,42b to the NE 30 which interconnect between the CTX modules 40a,40b over a processor interface bus system (PIF) 52 to form a larger switch fabric. FIG. 3 generally illustrates control plane connectivity in the switch NE 30.

The CTX modules 40a,40b include both switching, timing, and control functionality. The CTX modules 40a,40b include a field programmable gate array (FPGA) 54, a fabric element 56, a time-space switch 58, an Ethernet switch 60, a timing module 62, and a central processing unit (CPU) 64. The FPGA 54 is configured to interface to the PIF 52 to enable control and communications between the CTX modules 40a, 40b and the SMs 42a,42b. The FPGA 54 connects to the fabric element 56 through a local bus, to the time-space switch 58 through a local bus, to the CPU 64 through a local bus, and to the timing module 62 for control and fault information.

The fabric element 56 is configured to provide the center stage switching functionality of the Clos switch. The fabric element 56 is connected to fabric access processors 74 on the LMs 44 with packet-based serial links. For example, the fabric element 56 can include up to 64×3.125 Gb/s serial links. The time-space switch 58 is an application specific integrated circuit (ASIC) also configured to provide the center stage switching functionality of the Clos switch. For example, the time-space switch 58 can provide switching based on OTN. The time-space switch 58 interfaces to a time-space switch 70 on the line modules 44 through a high-speed time-division multiplexed serial link (not shown). For example, the time-space switches 70 on the line modules 44 provide ingress and egress stages of a three-stage Clos switch fabric. Also, the CTX modules 40a,40b can include multiple time-space switches 58.

The Ethernet switch 60 is configured to provide layer two Ethernet switching, and interfaces the CPU 64. The timing module 62 provides synchronization to the NE 30. For example, the timing module 62 can receive a timing reference signal, such as a building integrated timing supply (BITS). Also, the timing module 62 can recover a timing signal from a line interface or provide a holdover reference from an internal clock source. The timing module 62 receives an interface from the CPU 64 through a serial peripheral interface (SPI). The CPU 64 provides control of the CTX module 40a,40b. Also, the CPU 64 provides the control functionality of the switch fabric and the NE 30 in general.

The LMs 44 are configured to interface clients and to provide the ingress and egress stages of the three-stage Clos switch. The line modules 44 include the time-space switch 70, XFP/SFP modules 72, a fabric access processor 74, an FPGA 76, a mapper/framer 78, a media access control (MAC) device 80, a network processor (NPU) 82, and a CPU 84. The XFP/SFP modules 72 provide optical client interfaces, and connect to the CPU 84 through an inter-integrated circuit (I2C) bus. The fabric access processor 74 is configured to provide traffic management for accessing the switch fabric, and the fabric access processor 74 connects to the FPGA 76 through a streaming interface. The FPGA 76 interfaces between the fabric access processor 74 and the CPU 84.

The mapper/framer 78 is configured to provide framing of TDM signals, such as OTN, SONET, or the like and mapping of layer two data into those signals. For example, the mapper/framer 78 can frame/de-frame signals received from the XFP/SFP modules 72. The mapper/framer 78 communicates to the CPU 84 over a local bus, and to the NPUs and/or time-space switch 70 over point-to-point interconnects. The MAC device 80 provides layer two functionality. The NPU 82 can provide layer two network processing functions, and the CPU 84 provides general control of the line module 44.

The SMs 42a,42b can expand the center-stage switch fabric of the CTX modules 40a,40b to support a larger capacity, i.e. additional LMs 44. The SMs 42a,42b include an FPGA 90, a fabric element 92, and a time-space switch 94. The FPGA 90 interfaces to the FPGA 54 on the CTX modules 40a,40b through the PIF 52. The fabric element 92 communicates to the FPGA 90 through a local bus, and the time-space switch 94 communicates to the FPGA 90 through a local bus. Also, the SMs 42a,42b can include multiple time-space switches 94.

Figure 4:
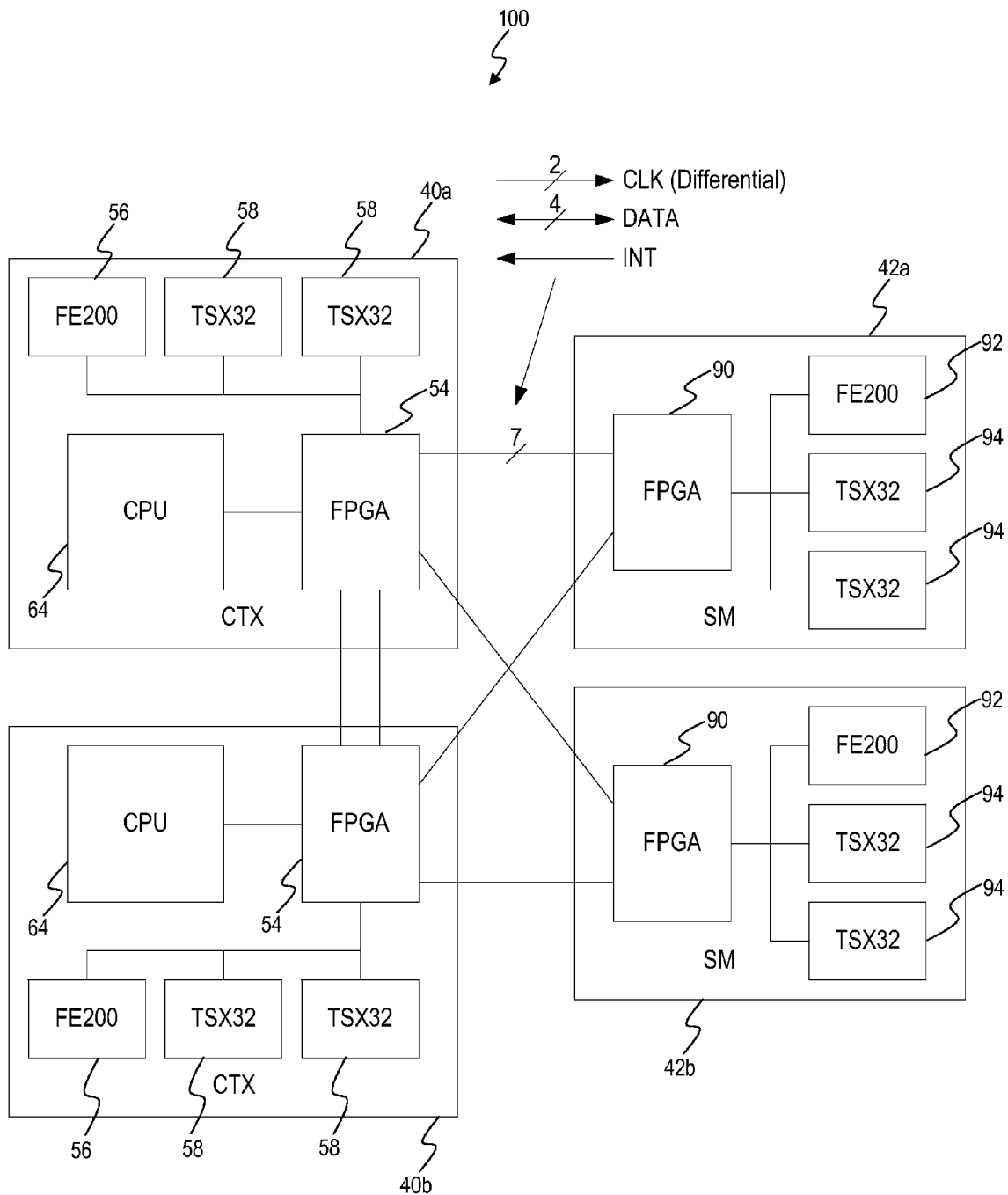
FIG. 4 is a block diagram illustrating control of the switching functions of the NE of FIGS. 2 and 3 according to an exemplary embodiment of the present invention.

Referring to FIG. 4, control 100 of the switching functions of the NE 30 is illustrated according to an exemplary embodiment of the present invention. In an exemplary embodiment, the present invention allows the primary CTX 40a to have direct control of the switching fabric 56,58 on the secondary CTX 40b. This supports fabric provisioning the same whether on the CTX modules 40a,40b or the SMs 42a,42b. The present invention utilizes serial control mechanisms to allow bus access to fabric elements. The bus access to fabric elements is locally arbitrated. This requires an additional interface between the CTX modules 40a,40b along with additional hardware to arbitrate access to the fabric bus.

In this exemplary embodiment of the bus control 100, the FPGAs 54,90 provide arbitration and access to the bus. For example, the bus can include seven lines including two differential clock lines, four data lines, and an interrupt line. Additionally, the FPGAs 54 can include the additional connection between the CTX modules 40a,40b. This additional connection is utilized for the primary CTX 40a to control the switch fabric 56,58 on the secondary CTX 40b.

Figure 5:
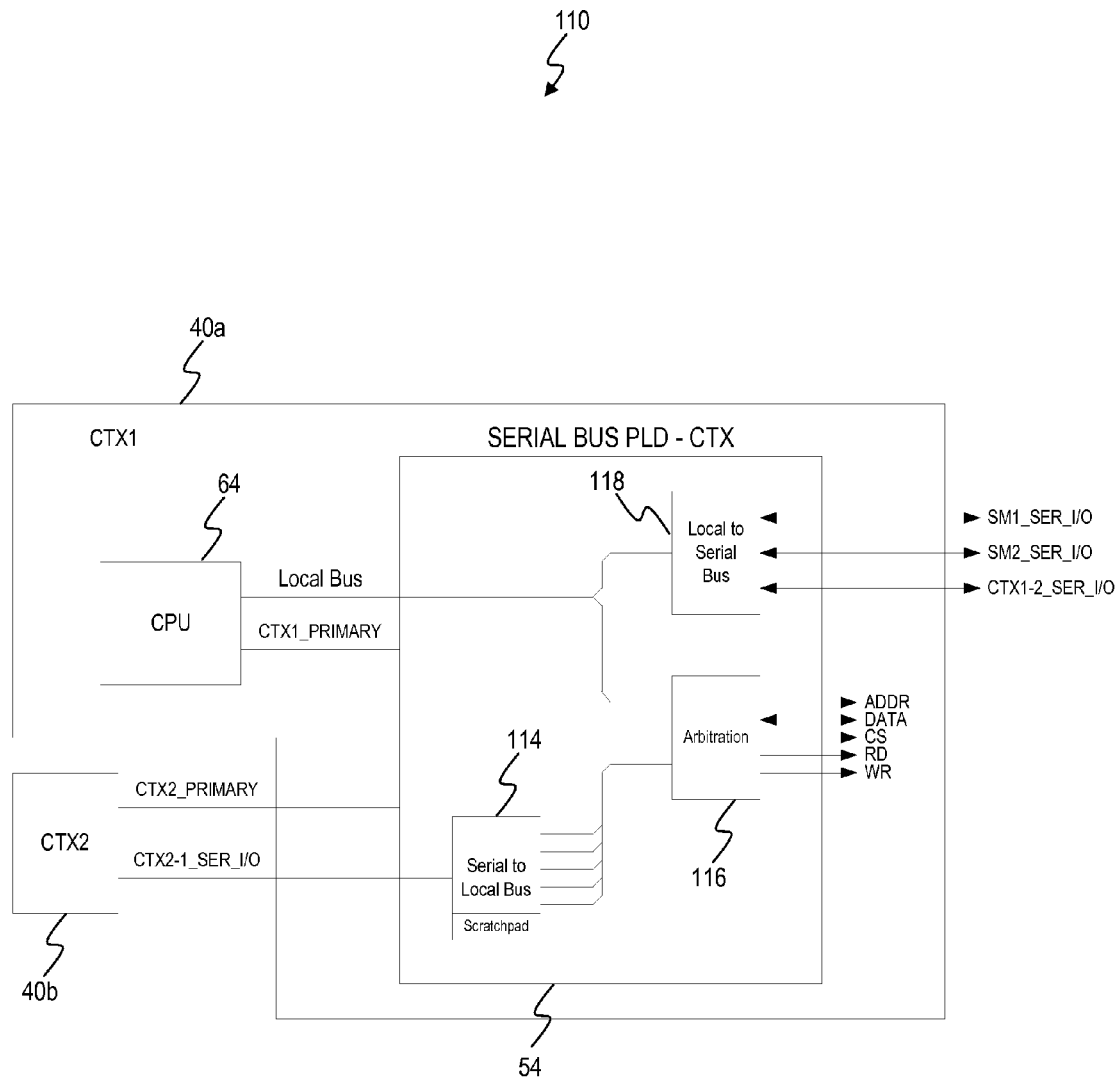
FIGS. 5 and 6 are block diagrams illustrating access between the primary and secondary CTX modules according to an exemplary embodiment of the present invention.
Figure 6:
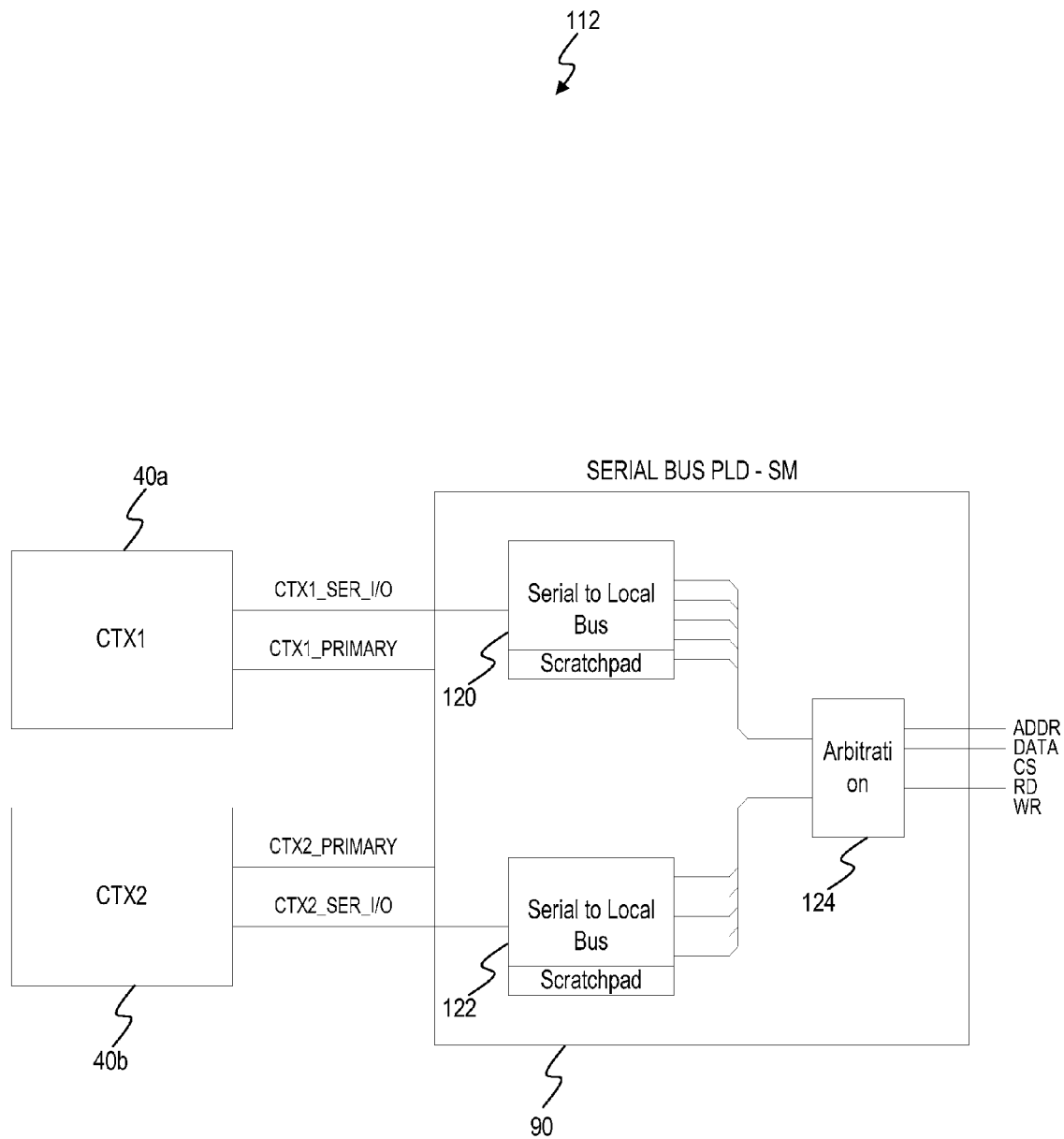

Referring to FIGS. 5 and 6, access 110,112 between the primary and secondary CTX modules 40a,40b is illustrated according to an exemplary embodiment of the present invention. The primary and secondary CTX modules 40a,40b each independently connect to the SMs 42a,42b (not shown in FIG. 5). FIG. 5 illustrates the primary CTX module 40a acting as a master to the secondary CTX module 40b with the SMs 42a,42b for configuring the switch fabric. The FPGA 54 includes a serial to local bus interface 114, an arbitration block 116, and a serial to local bus interface 118. FIG. 6 illustrates a direct connection between the CTX modules 40a,40b and the FPGA 90 on the SMs 42a,42b. The FPGA 90 includes serial to local bus interfaces 120,122 and an arbitration block 124. In an exemplary embodiment, the access 110,112 utilizes 16 bit addressing with 32 bits of data plus approximately six overhead clock cycles. At a transfer rater of 400 MHz or 4×100 MHz, this yields an estimated access time on the order of 180 ns for serial transaction plus 100 ns for device access time.

Figure 7:
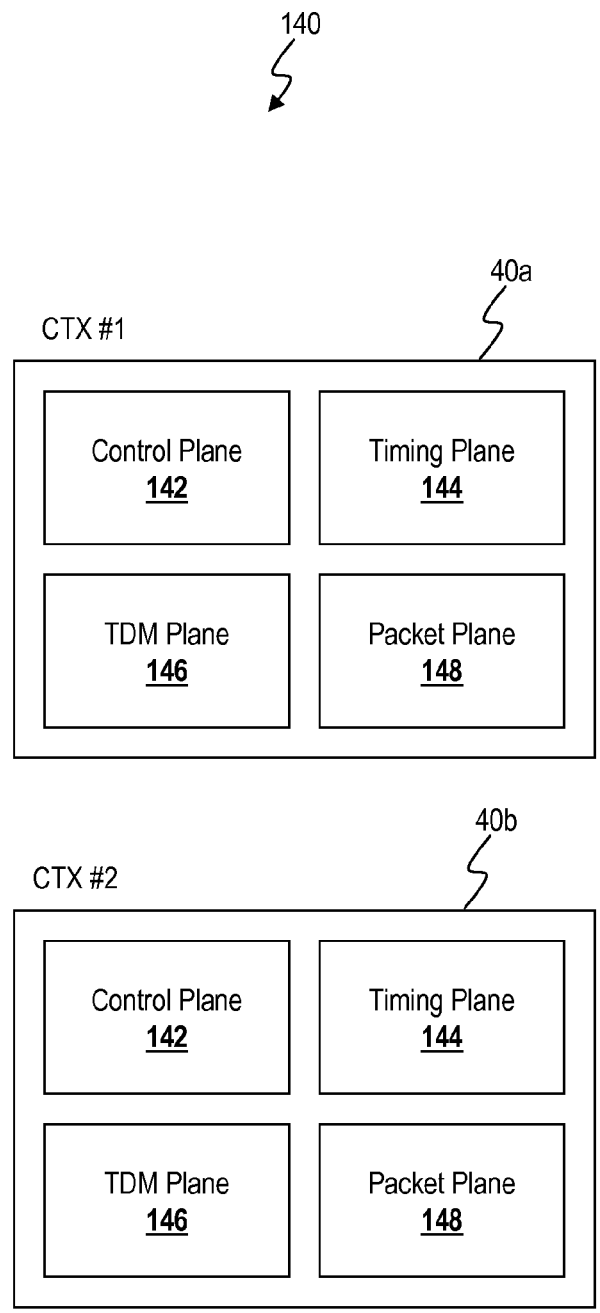
FIG. 7 is a block diagram illustrating various operational planes associated with the CTX modules according to an exemplary embodiment of the present invention.

Referring to FIG. 7, a block diagram 140 illustrates various operational planes 142,144,146,148 associated with the CTX modules 40a,40b according to an exemplary embodiment of the present invention. These operational planes 142,144,146, 148 represent functions including a control plane 142, a timing plane 144, a time division multiplexing (TDM) plane 146, and a packet plane 148. Collectively, the TDM plane 146 and the packet plane 148 represent the switching fabric. The various planes 142,144,146,148 can either be active (i.e., working) or standby (i.e., protect). Note, the planes 142,144,146, 148 are described as an exemplary illustration, and the present invention contemplates redundancy with other planes as are used in network elements.

In an exemplary embodiment of the present invention, the CTX modules 40a,40b operate under redundancy rules. First, the active timing plane 144 and active control plane 142 is always on the same CTX module. In the absence of failures or an administrative lock, the active TDM plane 146 is on the secondary CTX module and possibly on SM modules (if utilized). The active packet plane 148 in the absence of failures or administrative lock is on both CTX modules and any SM modules (if utilized).

Failure of any system or subsystem on a CTX module causes the system to remove all traffic and timing from that module and to relinquish its primary role if possible. Failed components are isolated to the maximum extent possible from the rest of the system. A CPU reboot does not constitute a failure, but not recovering from the reboot within a predetermined time period can be a failure. In the case of a double CTX or SM failure, the system attempts to degrade gracefully.

An administrative lock can only be performed on a secondary CTX module. The administrative lock of the secondary CTX module moves traffic off the CTX module for the duration of the lock. If this causes a traffic loss, a user is required to execute a "forced" administrative lock. For example, this could occur if an SM is missing as well, resulting in a reduced switch fabric capacity. An administratively locked CTX does not become a primary module except for a catastrophic failure of a peer CTX module, e.g. a removed peer CTX, etc.

Referring to FIG. 8, a card status table 150 illustrates possible states for each of the CTX modules according to an exemplary embodiment of the present invention. Here, each module provides a status to its peer modules. For example, a two-bit identifier referred to as Card_Status[n] where n=0,1 can be utilized between the CTX modules to provide a status of which state the CTX module is in. Advantageously, this card status enables the CTX modules to operate concurrently as working modules according to the mechanisms described herein.

When the slot is empty, i.e. the CTX module is removed, the Card_Status is irrelevant, i.e. "don't care." When the Card_Status is [00], the CTX module is seated, full reset recovery is in progress, hardware has failed, or an external reset has completed. In the case where external reset has completed, there may be a delay of 10-100 ms for orderly shutdown from receipt of the reset command. When the Card_ Status is [01], the CTX module is booting. When the Card_ Status is [10], there is partial software available, e.g. more detailed status information can be retrieved over Ethernet messaging. Finally, when the Card_Status is [11], full software is available, i.e. the CTX is properly working.

Figure 9:
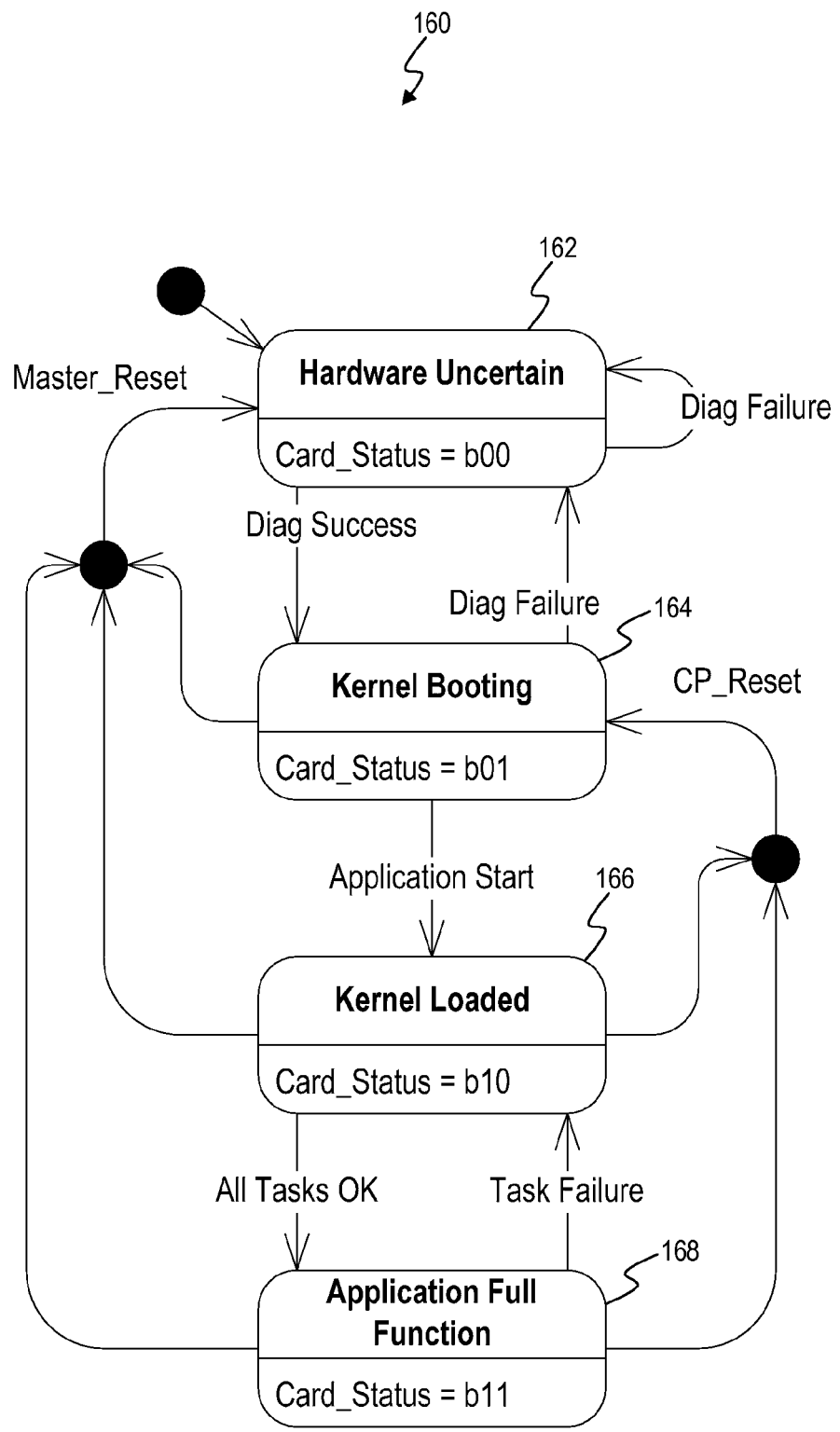
FIG. 9 is a state diagram illustrating Card_Status transitions of a CTX module according to an exemplary embodiment of the present invention.

Referring to FIG. 9, a state diagram illustrates Card_Status transitions 160 of a CTX module according to an exemplary embodiment of the present invention. The transitions 160 illustrate a state diagram of the Card_Status described in FIG. 8. The Card_Status bits are driven by software (and by hardware on resets). External, power-up, or ejector open resets Card_Status to [00] and the hardware is uncertain (state 162). Any Master_Reset or diagnostic failure leads back to the uncertain hardware state 162. Successful completion of hardware diagnostics leads to the Card_Status set to [01] and the kernel is booting (state 164). A circuit pack reset (CP_reset) leads back to the kernel booting state 164. When the kernel is loaded and the application is ready to communicate with other cards, the Card_Status is set to [10] (state 166). When the application is fully functional, the Card_Status is set to [11] (state 168).

The CTX module supports power-on reset, master reset, control plane reset, and individual device or plane resets. The master reset is asserted when an ejector is open, i.e. the CTX is removed from a shelf, and upon full external reset. The control plane reset is asserted by software command, CPU voltage monitor, and external circuit pack reset. The timing, TDM, and packet plane resets are held following master reset, and must be released by software control. An external reset command can indicate that a reset is due to fault isolation/mitigation action allowing a recovering control plane to implement correct behavior.

Each module (e.g., CTX modules, SM modules, LM modules, etc.) includes ejector latches. The ejector latch is configured to lock the module into a chassis. The process for inserting modules into the chassis can include inserting the module into a backplane on the chassis and closing the ejector latches. The process for removing modules from the chassis can include opening the ejector latches and removing the modules from the backplane. A CPU on the control plane of the CTX module is configured to receive an indication when an ejector latch is opened or closed for each module.

Referring to FIGS. 10-42, various operational scenarios are illustrated with CTX modules, SM modules, and LM modules, and the associated functions of the control, timing, TDM, and packet planes on each module according to exemplary embodiments of the present invention. The various operational scenarios are illustrated in tables showing states of the various planes for each CTX at various snapshots in time for various exemplary scenarios.

Figure 10:
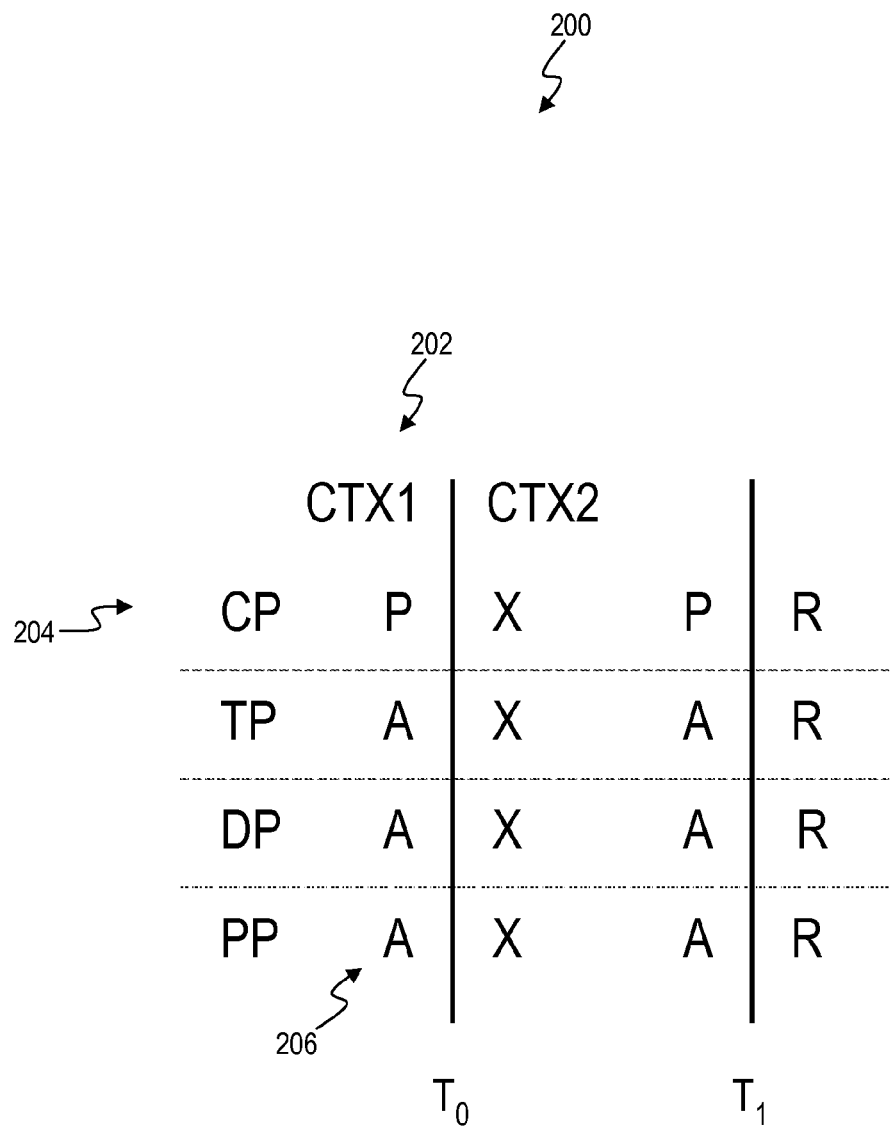

FIG. 10 illustrates an example table of CTX module subsystem states 200. The table 200 is a compact representation of a time sequence for subsystem states on multiple cards in a network element (e.g., chassis). Columns 202 represent individual cards, such as CTX1 and CTX2 for a first and second CTX module, SM for a switch module, and LM for a line module. Columns 202 are also indexed according to time periods, i.e. $T_0$, $T_1$, $T_2$, etc. Note, for each time period, a column is shown for each module involved in the operational scenario. Rows 204 represent subsystems on each card, such as a control plane (CP), timing plane (TP), TDM plane (DP), and packet plane (PP). Description text 206 is included for each time snapshot describing the event which precipitated change and actions occurring to reach the state. For example, the description text 206 includes the following abbreviations:

| Abbreviation | State |
| --- | --- |
| A | Active |
| B | Booting |
| D | Deactivated |
| F | Failed |
| P | Primary |
| R | Reset |
| S | Secondary or Standby |
| U | Upgrading |
| X | Removed |

The states (i.e., events) related to the control plane (CP) subsystem on the CTX modules include:

| | | |
| --- | --- | --- |
| B | Booting | The CTX control plane is recovering from a reset and software has not reached primary or secondary state |
| P | Primary | The CTX control plane is hardware primary and the software is in the Primary state. |
| S | Secondary | The CTX control plane hardware is not primary and the software is in the Secondary state. |
| U | Upgrading | The CTX control plane is booting up into the Upgrade state. |
| F | Failed | The CTX CPU cannot boot, or it can't communicate with other cards via the IIMC. |
| R | Held in Reset | The CTX CPU complex is held in reset by the peer CTX |
| X | Removed | The CTX is unseated from the backplane. |

The states (i.e., events) related to the timing plane (TP) subsystem on the CTX modules include:

| | | |
| --- | --- | --- |
| A | Active | The timing plane outputs are enabled and LMs are selecting this CTX as the timing source. |
| S | Standby | The timing plane outputs are enable, but the LMs are not selecting this CTX as the timing source. |
| D | Deactivated | The timing plane outputs are squelched to prevent usage by LMs due to administrative or fault reasons. Send AIS on BITS. |
| R | Reset | The timing circuitry is held in reset. |
| X | Removed | The CTX is unseated from the backplane. |

The states (i.e., events) related to the TDM plane (DP) and packet plane (PP) subsystems on the CTX modules, SM modules, and LM modules include:

| | | |
| --- | --- | --- |
| A | Active | The data fabric is carrying traffic |
| S | Standby | The data fabric is capable of carrying traffic, but is not being used to do so. |
| D | Deactivated | Due to administrative or fault reasons, the data fabric is blocked from carrying traffic. SLP-18/108 outputs are squelched to prevent corrupt frames. |
| R | Reset | The data circuitry is held in reset. |
| X | Removed | The module is unseated from the backplane. |

Figure 11:
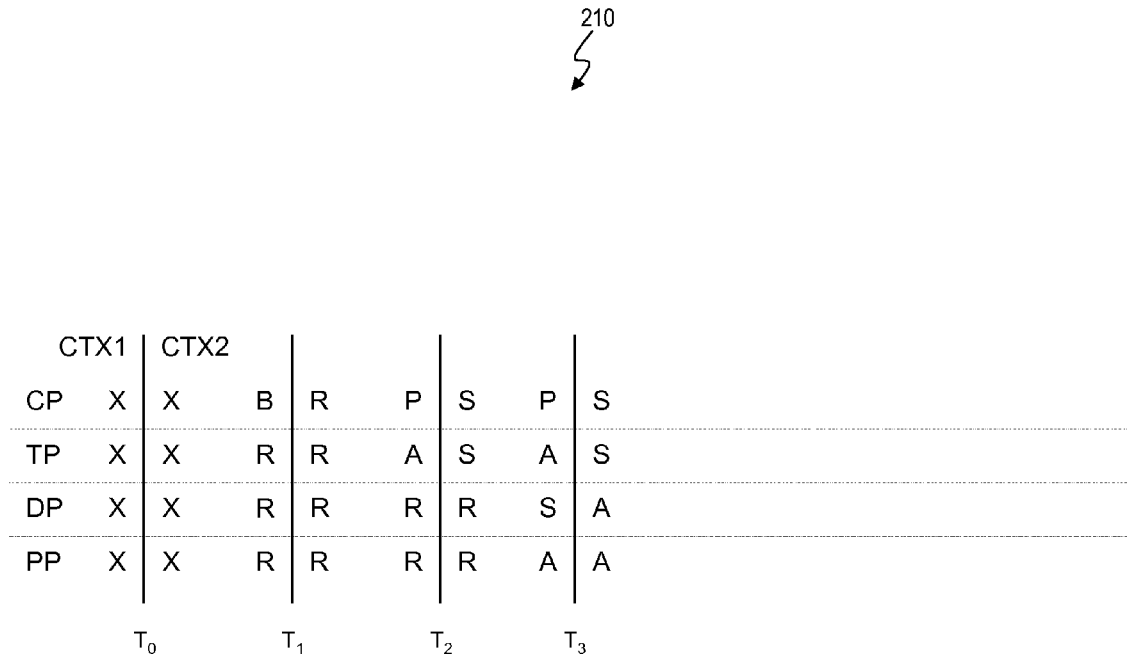

Referring to FIG. 11, a table illustrates CTX subsystem states 210 at system power up. At $T_0$, the initial condition, the chassis is powered off, and both the CTX modules and all the corresponding subsystems are removed (X). At $T_1$, power on, the first CTX module boots first with the CP subsystem booting and the remaining subsystems in reset. The second CTX module has all subsystems in reset. At $T_2$ after power on, the first CTX module becomes the primary CP module, the TP is active, and the data planes are in reset. The second CTX module is standby for the CP and TP subsystems, and in reset for the data planes. At $T_3$, second CTX module is qualified by a fault management framework (FMF) and the DP and PP are brought into service as the active subsystems with the DP on the first CTX in standby. Note, the PP subsystem can be active on both the CTX modules. The fault management framework is a software subsystem that monitors the systems, especially the data and control planes, for hardware faults and it is also configured to implement corrective actions.

Referring to FIG. 12, a table illustrates CTX subsystem states 212 when inserting a second CTX module. At $T_0$, the initial condition, the first CTX module is the only one in the chassis and the CP is primary and all other subsystems are active. At $T_1$, a second CTX module is inserted, but the ejector latch on the CTX module is still open, i.e. the module is inserted into a backplane, but the latch is not closed. Each subsystem on the second CTX is in reset while the first CTX module continues in the same states as shown at $T_0$. At $T_2$, the ejector latch on the second CTX module is closed, and the second CTX module boots with all the subsystems in standby. At $T_3$, the DP and PP subsystems are qualified by the FMF and become active with the CP and TP subsystems as standby.

Figure 13:
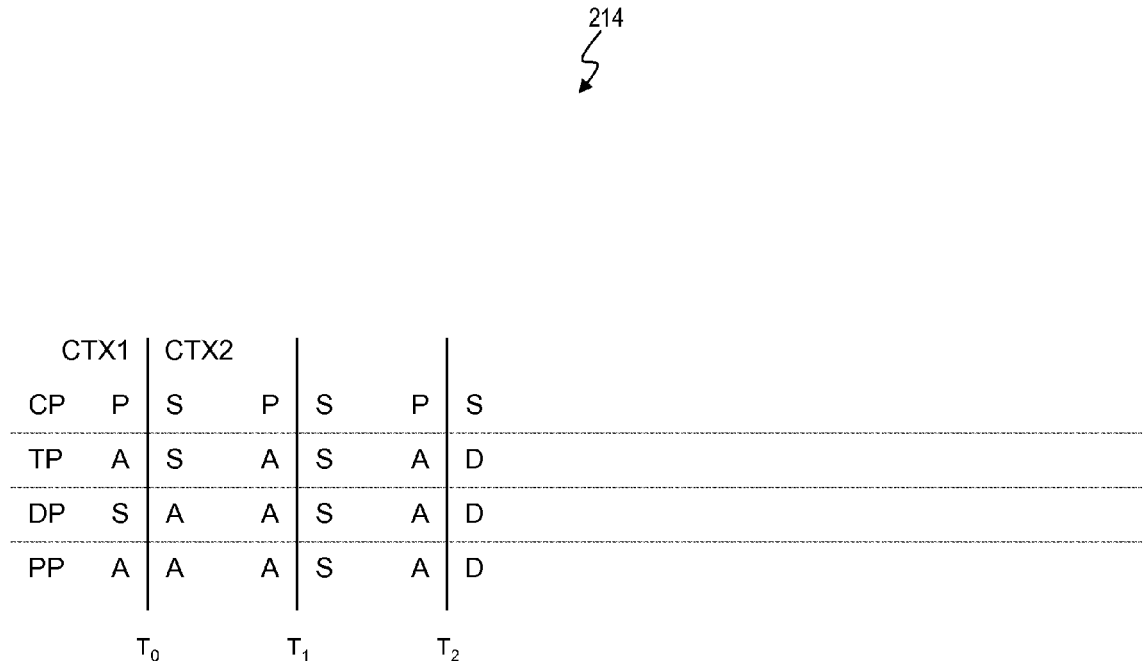

Referring to FIG. 13, a table illustrates CTX subsystem states 214 for an administrative lock on a second CTX module. At $T_0$, the initial condition, the first CTX module is primary for the CP subsystem and active for the TP and PP subsystems, and the second CTX module is standby for the CP and TP subsystems and active for the DP and PP subsystems. At $T_1$, the second CTX module is placed in administrative lock. Note, in this exemplary embodiment, only the secondary CTX module can be placed in administrative lock. Here, all traffic from the DP and PP subsystems is moved to the first CTX module, and the second CTX module is standby on all subsystems. At $T_2$, the TP, DP, and PP subsystems are deactivated on the second CTX module, and the CP subsystem remains as standby.

Referring to FIG. 14, a table illustrates CTX subsystem states 216 for an administrative lock on a SM module. Of note, FIG. 14 includes a third column for the SM module. As described herein, the SM module provides an expansion of the DP and PP subsystems for a larger switch core. The SM module does not include CP or TP subsystems. At $T_0$, the initial condition, the first and second CTX modules are working normally, and the SM module is unlocked with an active DP and PP subsystems. At $T_1$, the SM module is placed in administrative lock, and the DP and PP subsystems are placed in standby. Traffic from the DP subsystem is moved without interruption to the first CTX module, and packet traffic from the PP subsystem is re-routed away from the SM module without interruption. At $T_2$, the DP and PP subsystems on the SM module are deactivated.

Referring to FIG. 15, a table illustrates CTX subsystem states 218 for a hitless removal of a CTX module. At $T_0$, the initial condition, the first CTX is primary for the CP subsystem and active for all other subsystems, and the second CTX is administratively locked, such as described in FIG. 13. At $T_1$, the ejector latches on the second CTX module are opened, and all subsystems are placed in reset. At $T_2$, the second CTX module is removed from the chassis.

Figure 16:
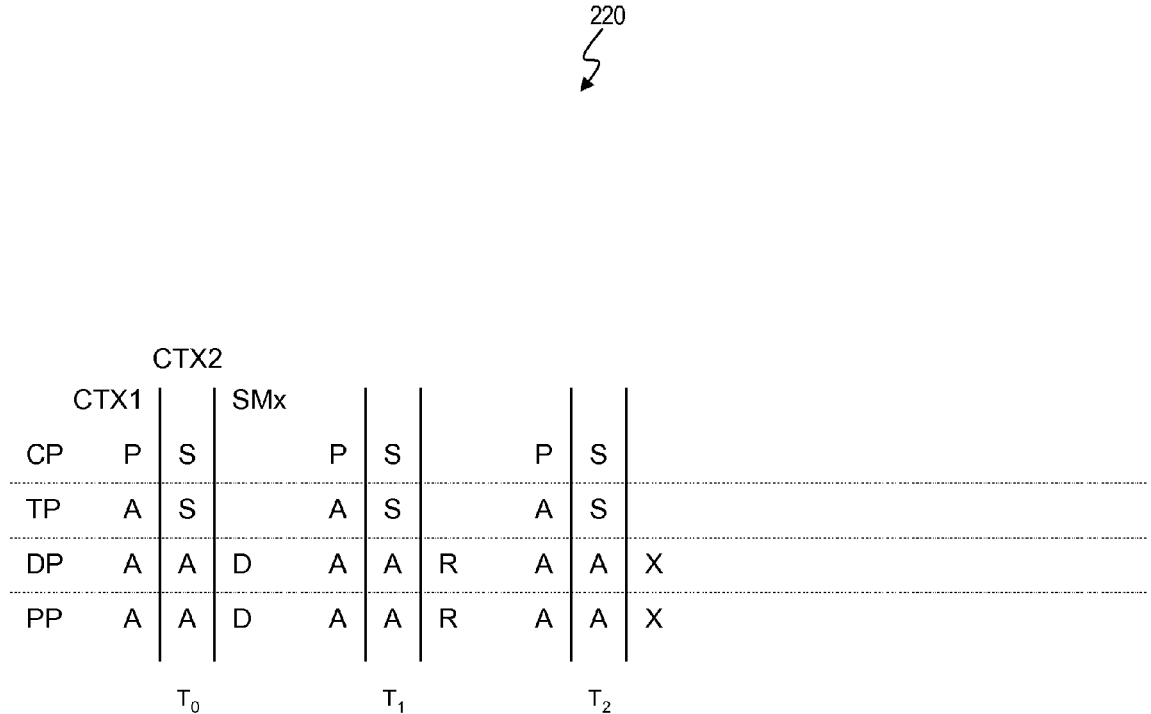

Referring to FIG. 16, a table illustrates CTX subsystem states 220 for a hitless removal of a SM module. At $T_0$, the initial condition, the first CTX is primary for the CP subsystem and active for all other subsystems, the second CTX is standby for the CP and TP subsystems and active for the DP and PP subsystems, and the SM module is administratively locked, such as described in FIG. 14. When the SM module is administratively locked, the DP and PP subsystems on the first CTX module are configured to take over for the SM module. At $T_1$, the ejector latches on the SM module are opened and the SM module subsystems are held in reset. At $T_2$, the SM module is removed from the chassis.

Referring to FIG. 17, a table illustrates CTX subsystem states 222 for an administrative unlock of a CTX module. At $T_0$, the initial condition, the first CTX module is primary for the CP subsystem and active for all other subsystems, and the second CTX module is administratively locked. At $T_1$, the second CTX is administratively unlocked and the TP, DP, and PP subsystems are released from locked mode into standby. Here, the subsystems are operational, but do not yet carry traffic. At $T_2$, the TP, DP, and PP subsystem are brought into service after being qualified, and the CP subsystem is standby.

Referring to FIG. 18, a table illustrates CTX subsystem states 224 for opening and closing of ejector latches of a primary CTX module. At $T_0$, the initial condition, the first CTX module is the primary for the CP subsystem, and the second CTX module is standby. At $T_1$, the ejector latches on the first CTX module are opened. Accordingly, the DP and PP subsystems on the first CTX module implement plane isolation procedures and are placed into reset along with the CP and TP subsystems. Here, the DP plane is isolated in between switch frames to prevent runt frames from propagating through the switch fabric. For example, the switch fabric on the first CTX module can stop sending reachability messages immediately, and then wait 2 to 4 ms to allow upstream senders to reach and for in-flight packets to be flushed. At $T_2$, the second CTX module assumes a primary role for the CP subsystem and moves all traffic to itself from the first CTX module. Also, the second CTX module is active on all other subsystems. The first CTX module is in reset on all subsystems. At $T_3$, the ejector latches on the first CTX module are closed. Here, the CPU on the first CTX module boots and assumes a secondary role with the TP, DP, and PP subsystems released from reset into standby. At $T_4$, the TP, DP, and PP subsystems on the first CTX are qualified and brought into service. Note, the first CTX module is not standby for the CP and TP subsystems, and active on the DP and PP subsystems.

Referring to FIG. 19, a table illustrates CTX subsystem states 226 for an unplanned removal of a second CTX module. At $T_0$, the initial condition, the first CTX module is the primary for the CP subsystem, active for the PP subsystem, and standby for the DP subsystem, and the second CTX module is standby for the CP and TP subsystems and active for the TP and PP subsystems. At $T_1$, the ejector latches are opened on the second CTX module. The first CTX module receives an interrupt via the serial PIF and has a recomputed switch fabric. Note, the recomputed switch fabric may not be recomputed in time to avoid a traffic hit. Here, the DP subsystem is isolated in between switch frames to prevent runt frames propagating through the switch fabric. The switch fabric stops sending reachability messages immediately, and then waits 2 to 4 ms to allow upstream senders to react and for in-flight packets to be flushed. The DP and PP subsystems are deactivated. At $T_2$, after 50 ms, the second CTX module is fully reset, and at $T_3$, the second CTX module is extracted.

Referring to FIG. 20, a table illustrates CTX subsystem states 228 for a software upgrade where the CTX restarts faster than synchronization state machines (SSMs). In the present invention, there are a large number of software subsystems dependent upon one another. Each subsystem is moved through a set of synchronization states (i.e., SSMs) to initialize them in a specific order to support these dependencies. The system is considered functional once all the SSMs have completed. At $T_0$, the initial condition, the first CTX module is primary for the CP subsystem, active for the TP and PP subsystem, and standby for the DP subsystem. The second CTX module is standby for the CP and TP subsystems and active for the DP and PP subsystems. Here, the first CTX module receives a new software load image to upgrade. At $T_1$, the first CTX module begins upgrading the CP subsystem as the second CTX module becomes primary for the CP subsystem. The second CTX module starts to run SSMs, but the switch core has not yet recomputed the TDM fabric. Also, the TP management has not switched primary timing source. At $T_2$, the first CTX module release control planes on all other cards including the second CTX module, and it starts to run SSMs. Here, the first CTX module has upgraded, and takes over as the primary CP with the second CTX module now upgrading its CP subsystem. At $T_3$, the second CTX module boots into the secondary state, and the first CTX module finishes SSMs and recomputes switch fabric back to an original configuration.

Referring to FIG. 21, a table illustrates CTX subsystem states 230 for a software upgrade where the CTX restarts slower than the SSMs. At $T_0$, the initial condition, the first CTX module is primary for the CP subsystem, active for the TP and PP subsystem, and standby for the DP subsystem. The second CTX module is standby for the CP and TP subsystems and active for the DP and PP subsystems. Here, the first CTX module receives and processes a new software load image to upgrade. At $T_1$, the first CTX module begins upgrading the CP subsystem as the second CTX module becomes primary for the CP subsystem. The second CTX module starts to run SSMs, but the switch core has not yet recomputed the TDM fabric. Also, the TP management has not switched primary timing source.

At $T_2$, the second CTX module's SSMs are complete, the first CTX module's DP and PP subsystems have been validated, and the switch core computes a new TDM fabric. Here, the second CTX module is now active for the TP subsystem and standby for the DP subsystem. At $T_3$, the first CTX module resets control planes on all other cards including the second CTX module, and it starts to run SSMs. At $T_4$, the first CTX module finishes SSMs and recomputes the switch fabric back to an original configuration. The first CTX module becomes the primary for the TP subsystem. At $T_5$, the second CTX module finishes booting and becomes the secondary CTX module.

Referring to FIG. 22, a table illustrates CTX subsystem states 232 for a catastrophic failure on the primary CTX module. At $T_0$, the initial condition, the first CTX module is primary for the CP subsystem, active for the TP and PP subsystems, and standby for the DP subsystem. The second CTX module is standby for the CP and TP subsystems and active for the DP and PP subsystems. At $T_1$, the first CTX module experiences a full power failure and all subsystems are removed. The DP is not affected since the second CTX module is active for the DP subsystem. Packet traffic is briefly affected as traffic moves from the active PP on the first CTX module to the active PP on the second CTX modules. The TP switches cleanly with no interruption. At $T_2$, the second CTX module becomes primary for the CP subsystem and active for all other subsystems.

Referring to FIG. 23, a table illustrates CTX subsystem states 234 for a catastrophic failure on the secondary CTX module. At $T_0$, the initial condition, the first CTX module is primary for the CP subsystem, active for the TP and PP subsystems, and standby for the DP subsystem. The second CTX module is standby for the CP and TP subsystems and active for the DP and PP subsystems. At $T_1$, the second CTX module experiences a full power failure and all subsystems are removed. The DP and PP subsystems are briefly affected as traffic is switched to the first CTX module. At $T_2$, the first CTX module reprograms ingress, egress, and center stage switches to use the first CTX DP subsystem becoming active on the DP subsystem.

Referring to FIG. 24, a table illustrates CTX subsystem states 236 for a primary CTX software failure. At $T_0$, the initial condition, the first CTX module is primary for the CP subsystem, active for the TP and PP subsystems, and standby for the DP subsystem. The second CTX module is standby for the CP and TP subsystems and active for the DP and PP subsystems. At $T_1$, the first CTX module experiences a software failure which can be detected through a CTX_Status and CTX_Primary message as well as through beacon loss. Accordingly, the CP subsystem on the first CTX module is booting. At $T_2$, the second CTX module takes over as the primary CP and begins initialization and SSMs. Also, the TP on the second CTX module takes over as active. At $T_3$, the second CTX module requalifies the DP and PP on the first CTX module and reprograms the switch fabric to move TDM traffic to the DP subsystem on the first CTX module. Accordingly, the first CTX module now is active on the DP subsystem with the second CTX module in standby. At $T_4$, the first CTX module reboots and comes up in a secondary state.

Referring to FIG. 25, a table illustrates CTX subsystem states 238 for a secondary CTX software failure. At $T_0$, the initial condition, the first CTX module is primary for the CP subsystem, active for the TP and PP subsystems, and standby for the DP subsystem. The second CTX module is standby for the CP and TP subsystems and active for the DP and PP subsystems. At $T_2$, the second CTX module experiences a software failure rebooting the CP subsystem. Here, there is no indication of TP, DP, or PP failure on the second CTX, and as such, the first CTX module does not react. At $T_3$, the second CTX module reboots and returns to the secondary state.

Referring to FIG. 26, a table illustrates CTX subsystem states 240 for a primary CTX CPU failure. At $T_0$, the initial condition, the first CTX module is primary for the CP subsystem, active for the TP and PP subsystems, and standby for the DP subsystem. The second CTX module is standby for the CP and TP subsystems and active for the DP and PP subsystems. At $T_1$, the first CTX module detects a software failure caused by a CPU failure. This is detected by a CTX_Status message, CTX_Primary message, or by beacon loss. The first CTX module CP is shown as booting, and the second CTX module CP is in standby. At $T_2$, the second CTX module CP is set to primary.

At $T_3$, the second CTX module CP requalifies its TP to active and the first CTX module TP is standby. The second CTX module also requalifies the DP and PP on the first CTX module and reprograms the switch fabric to move DP traffic to the first CTX module, i.e. to make the first CTX module secondary. At $T_4$, the first CTX module fails to recover, i.e. reboot its CPU after a predetermined time period. Accordingly, the first CTX module is set as failed, and it's DP and PP traffic is moved off to the second CTX module. The first CTX module's CP is set to failed and all other subsystems are set to standby, and the second CTX module has all subsystems as active. At $T_5$, the first CTX is given a momentary master reset, and the TP, DP, and PP subsystems remain in reset.

Referring to FIG. 27, a table illustrates CTX subsystem states 242 for a primary CTX Inter/Intra-Module Communications (IIMC) failure. The IIMC is an internal communications network used between processors on the same or different modules. At $T_0$, the initial condition, the first CTX module is primary for the CP subsystem, active for the TP and PP subsystems, and standby for the DP subsystem. The second CTX module is standby for the CP and TP subsystems and active for the DP and PP subsystems. At $T_1$, the first CTX module detects an Ethernet switch or connectivity failure and raises a Replaceable Unit Problem (RUP). RUP is a specific alarm condition indicating that a field replaceable unit (such as the CTX, SM, LM, etc.) has a hardware problem or serious software problem. The first CTX module checks to see if the second CTX module is ready to take over through Card_Status or arbitration beacons. If not, this scenario ends. At $T_2$, the first CTX module performs a master reset and the second CTX module becomes primary. At $T_3$, the master reset has not brought the first CTX module back, and the TP, DP, and PP on the first CTX module are left in reset.

Referring to FIG. 28, a table illustrates CTX subsystem states 244 for a secondary CTX IIMC failure. At $T_0$, the initial condition, the first CTX module is primary for the CP subsystem, active for the TP and PP subsystems, and standby for the DP subsystem. The second CTX module is standby for the CP and TP subsystems and active for the DP and PP subsystems. At $T_1$, the second CTX module detects an Ethernet switch or connectivity failure. If the second CTX module can still communicate to the first CTX module, it reports a failure to the first CTX. If they cannot communicate, the first CTX module assumes failure on the second CTX and a RUP is raised against the second CTX module. Assuming failure, at $T_2$, traffic from the DP and PP subsystems on the second CTX module is moved to the first CTX module and the second CTX module is momentarily reset fully by the first CTX module. At $T_3$, the second CTX module is secondary with all subsystems in reset.

Referring to FIG. 29, a table illustrates CTX subsystem states 246 for a primary CTX PIF failure. At $T_0$, the initial condition, the first CTX module is primary for the CP subsystem, active for the TP and PP subsystems, and standby for the DP subsystem. The second CTX module is standby for the CP and TP subsystems and active for the DP and PP subsystems. At $T_1$, the first CTX module experiences a serial PIF failure and isolates the fault to itself. If possible, PP traffic from the first CTX module is migrated off the first CTX module. At $T_2$, the first CTX module performs a master reset on itself and the second CTX module becomes primary. At $T_3$, the first CTX module remains with all the subsystems in reset, and the CP on the first CTX module is set to standby.

Referring to FIG. 30, a table illustrates CTX subsystem states 248 for a secondary CTX PIF failure. At $T_0$, the initial condition, the first CTX module is primary for the CP subsystem, active for the TP and PP subsystems, and standby for the DP subsystem. The second CTX module is standby for the CP and TP subsystems and active for the DP and PP subsystems. At $T_1$, a serial PIF fault is isolated to the second CTX module. At $T_2$, DP and PP traffic is moved off the second CTX module and the second CTX module is fully reset by the first CTX module. At $T_3$, the second CTX module becomes secondary for the CP and the remaining subsystems are left in reset.

Referring to FIG. 31, a table illustrates CTX subsystem states 250 for a SM module PIF failure. At $T_0$, the initial condition, the first CTX module is primary for the CP subsystem, active for the TP and PP subsystems, and standby for the DP subsystem. The second CTX module is standby for the CP and TP subsystems and active for the DP and PP subsystems. The SM module is active for its DP and PP subsystems. At $T_1$, a serial PIF fault is isolated to the SM module and downstream switch fabric modules do not detect errors. Traffic from the SM module's DP and PP subsystems is moved to the first CTX module. At $T_2$, the SM module is held in reset.

Referring to FIG. 32, a table illustrates CTX subsystem states 252 for a timing plane fault on the primary CTX module. At $T_0$, the initial condition, the first CTX module is primary for the CP subsystem, active for the TP and PP subsystems, and standby for the DP subsystem. The second CTX module is standby for the CP and TP subsystems and active for the DP and PP subsystems. At $T_1$, a timing fault is detected on the first CTX module's TP subsystem and its outputs are deactivated. At $T_2$, the first CTX module raises a RUP on itself and moves traffic off of its PP subsystem. At $T_3$, the first CTX module performs a master reset on itself. At $T_4$, the second CTX module becomes primary after the reset of the first CTX module and the first CTX module is booting. At $T_5$, the first CTX module becomes secondary for the CP subsystem, but the remaining subsystems are held in reset due to the fault condition.

Referring to FIG. 33, a table illustrates CTX subsystem states 254 for a timing plane fault on the secondary CTX module. At $T_0$, the initial condition, the first CTX module is primary for the CP subsystem, active for the TP and PP subsystems, and standby for the DP subsystem. The second CTX module is standby for the CP and TP subsystems and active for the DP and PP subsystems. At $T_1$, a timing fault is detected on the second CTX module and a RUP is raised by the first CTX module against the second CTX module. At $T_2$, the DP and PP traffic is removed in a controlled fashion from the second CTX module to the first CTX module. At $T_3$, the second CTX module is momentarily fully reset by the first CTX module. At $T_4$, the second CTX module returns to the secondary state for the CP subsystem, but all remaining subsystems are held in reset.

Referring to FIG. 34, a table illustrates CTX subsystem states 256 for a data plane fault on the primary CTX module. At $T_0$, the initial condition, the first CTX module is primary for the CP subsystem, active for the TP and PP subsystems, and standby for the DP subsystem. The second CTX module is standby for the CP and TP subsystems and active for the DP and PP subsystems. At $T_1$, a fault is detected in the DP of the first CTX module, and the center stage switch is convicted for the first CTX module. The first CTX module raises a RUP against itself. Traffic is not affect, and the requalification process begins. At $T_2$, the requalification of the DP of the first CTX module fails, and the DP is reset. At $T_3$, the first CTX module resets itself knowing that the second CTX module is operational. At $T_4$, the second CTX module becomes primary after the reset of the first CTX module and the first CTX module is booting. At $T_5$, the second CTX module becomes active for the TP subsystem, and the first CTX module is secondary for the CP subsystem and all remaining subsystems are held in reset.

Referring to FIG. 35, a table illustrates CTX subsystem states 258 for a data plane fault on the secondary CTX module. At $T_0$, the initial condition, the first CTX module is primary for the CP subsystem, active for the TP and PP subsystems, and standby for the DP subsystem. The second CTX module is standby for the CP and TP subsystems and active for the DP and PP subsystems. At $T_1$, a fault is detected in the DP of the second CTX module and the center stage switch is convicted. Traffic is possibly it until the switch fabric is reprogrammed and the first CTX module DP becomes active. The first CTX module raises a RUP against the second CTX module and the requalification process begins. At $T_2$, the requalification of the DP of the second CTX module fails and the DP is reset on the second CTX module. At $T_3$, the second CTX module is reset by the first CTX module. At $T_4$, the second CTX module becomes secondary for the CP subsystem but all remaining subsystems are held in reset.

Referring to FIG. 36, a table illustrates CTX subsystem states 360 for a data plane fault on the SM module. At $T_0$, the initial condition, the first CTX module is primary for the CP subsystem, active for the TP and PP subsystems, and standby for the DP subsystem. The second CTX module is standby for the CP and TP subsystems and active for the DP and PP subsystems. The SM module is active for its DP and PP subsystems. At $T_1$, a fault is detected in the DP of the SM module and its center stage switch is convicted. Traffic is possibly hit until the switch fabric is reprogrammed an traffic moved to the first CTX module. The first CTX module raises a RUP against the SM module and begins the requalification process. At $T_2$, the requalification of the DP subsystem fails on the SM and the SM module's DP is isolated. Traffic is also removed from the PP subsystem. At $T_3$, the SM module is held in reset. Also, the SM module can be released from reset with the DP and PP subsystems in reset to allow diagnostic access.

Referring to FIG. 37, a table illustrates CTX subsystem states 262 for a packet plane fault on the primary CTX module. At $T_0$, the initial condition, the first CTX module is primary for the CP subsystem, active for the TP and PP subsystems, and standby for the DP subsystem. The second CTX module is standby for the CP and TP subsystems and active for the DP and PP subsystems. At $T_1$, a PP fault is detected in the first CTX module. All packet traffic is removed from the first CTX module and a RUP is raised by the first CTX module against itself The requalification process of the PP begins. At $T_2$, the requalification process fails and the PP is reset on the first CTX module. At $T_3$, the first CTX module performs a master reset on itself. At $T_4$, the second CTX module becomes primary after the reset of the first CTX module with the TP becoming active on the second CTX module. The first CTX module becomes secondary for the CP subsystem with all remaining subsystems held in reset.

Referring to FIG. 38, a table illustrates CTX subsystem states 264 for a packet plane fault on the secondary CTX module. At $T_0$, the initial condition, the first CTX module is primary for the CP subsystem, active for the TP and PP subsystems, and standby for the DP subsystem. The second CTX module is standby for the CP and TP subsystems and active for the DP and PP subsystems. At $T_1$, a PP fault is detected on the second CTX module. Packet traffic is removed from the second CTX module and a RUP is raised by the first CTX module against the second CTX module. The requalification process begins of the PP subsystem. At $T_2$, the requalification process fails and the PP is reset on the second CTX module. At $T_3$, DP traffic is moved from the second CTX module to the first CTX module and the second CTX module is momentarily reset by the first CTX module. At $T_4$, the second CTX module returns to secondary for the CP subsystem and the remaining subsystems are held in reset.

Referring to FIG. 38, a table illustrates CTX subsystem states 266 for a packet plane fault on the SM module. At $T_0$, the initial condition, the first CTX module is primary for the CP subsystem, active for the TP and PP subsystems, and standby for the DP subsystem. The second CTX module is standby for the CP and TP subsystems and active for the DP and PP subsystems. The DP and PP subsystems are active on the SM module. At $T_1$, a fault is detected in the PP of the SM module and its center stage is convicted. Traffic is possibly hit until reachability changes propagate and output queues drain. The first CTX module raises a RUP against the SM module and the requalification process begins. At $T_2$, the requalification of the PP on the SM module fails and its PP is reset. At $T_3$, traffic is removed from the SM module's DP to the first CTX module and the SM module is momentarily reset. At $T_4$, the DP and PP subsystems are held in reset on the SM module.

Referring to FIG. 40, a table illustrates CTX subsystem states 268 for a catastrophic failure on the first CTX module with the second CTX module in administrative lock. At $T_0$, the initial condition, the first CTX module is primary for the CP subsystem and active for all remaining subsystems. The second CTX module is secondary for the CP subsystem and deactivated for all remaining subsystems. At $T_1$, the first CTX module experiences a catastrophic failure, such as being pulled, power failure, rolling reboot, etc. Accordingly, all traffic is dropped on the first CTX module. At $T_2$, the second CTX module assumes primary for the CP subsystem and grabs all data communication links and reports alarms. At $T_3$, the second CTX module is autonomously unlocked from the administrative lock and all traffic is restored with no lost provisioning.

Referring to FIG. 41, a table illustrates CTX subsystem states 270 for a catastrophic failure on the first CTX module with the second CTX module in reset. At $T_0$, the initial condition, the first CTX module is primary for the CP subsystem and active for all remaining subsystems. The second CTX module is secondary for the CP subsystem and reset for all remaining subsystems. At $T_1$, the first CTX module experiences a catastrophic failure, such as being pulled, power failure, rolling reboot, etc. Accordingly, all traffic is dropped on the first CTX module. At $T_2$, the second CTX module clears any equipment faults and reboots itself. At $T_3$, the second CTX module comes up in the primary state for the CP subsystem, and its TP, DP, and PP subsystems are returned to service. Note, previous faults on the second CTX module (i.e., the reason why the subsystems were in reset) may or may not be rediscovered.

Referring to FIG. 42, a table illustrates CTX subsystem states 272 for a concurrent TP and DP failure on the first CTX module and on a line module (LM). At $T_0$, the initial condition, the first CTX module is primary for the CP subsystem and active for all remaining subsystems. The table also includes a column for the LM module. To start, the LM module is primary for its CP and its DP and PP are active. At $T_1$, a fault is detected in the DP of the LM module, and the first CTX module raises a RUP against the LM module. Traffic is partially affected on the LM module due to the failed DP, and the requalification process begins. At $T_2$, within a predetermined time, a TP fault is detected on the first CTX module. The RUP is lowered for the LM module and raised for the first CTX module. At $T_3$, mitigation of TDM traffic from the DP of the LM module is reversed, and the first CTX module resets itself. The second CTX module becomes primary, and the TP, DP, and PP subsystems are left in reset on the first CTX module. At $T_4$, the TP becomes active on the second CTX module, and the first CTX module is secondary for the CP and held in reset for all remaining subsystems.

The tables in FIGS. 10-42 are exemplary illustrations of an arbitration performed by the CTX modules. These mechanisms can be performed in conjunction with the hardware described herein. Those of ordinary skill in the art will recognize the present invention can include additional arbitration mechanisms, and the tables presented herein are illustrations.

Advantageously, the present invention supports combined control plane and switching functions on a single module while preserving 1:1 redundancy without requiring synchronization between switching functions. In an exemplary embodiment, a primary module has an active switch controller and standby switch fabric under normal operating conditions, and the secondary module has a standby switch controller and active switch fabric under the same normal conditions. The primary module's switch fabric becomes active when the secondary module fails or if another switch module fails. This provides carrier-grade redundancy between switch control and switch fabric while preserving space and hardware requirements.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A chassis with a redundant switch fabric and switch controller module, comprising:
a first module comprising a first switch fabric and a first control system, wherein the first switch fabric comprises a first data plane and a first packet plane, and wherein the first control system comprises a first control plane and a first timing plane; and
a second module comprising a second switch fabric and a second control system, wherein the second switch fabric comprises a second data plane and a second packet plane, and wherein the second control system comprises a second control plane and a second timing plane;
wherein the first module is configured to provide primary control functions and standby switch fabric functions, and the second module is configured to provide primary switch fabric functions and standby control functions;
wherein the first data plane and the second data plane are configured to switch time division multiplexed traffic, and wherein the first packet plane and the second packet plane are configured to switch Ethernet traffic;
wherein in normal operating conditions the first control plane is active and the second control plane is standby, the first timing plane is active and the second timing plane is standby, the second data plane is active and the first data plane is standby, and both the first packet plane and the second packet plane are active; and
wherein the first module and second module comprise arbitration mechanisms configured to provide redundancy in a failure event on one of the first module and the second module.

2. The chassis of claim 1, wherein the first module and the second module interconnect through a processor interface bus system.

3. The chassis of claim 1, wherein switch configuration information for the second switch fabric is stored in the first control system;
wherein responsive to a failure on the first module, the primary control functions switch to the second control system and the primary switch fabric experiences no traffic interruption; and
wherein responsive to a failure on the second module, the primary switch fabric switches to the standby switch fabric which utilizes the switch configuration information in the first control system to update the first switch fabric.

4. The chassis of claim 1, wherein the arbitration mechanisms are configured to isolate the failure event and to provide a reset to clear the failure; and
wherein if the reset does not clear the failure, the arbitration mechanisms reset one of the first module and the second module with the failure event while maintaining one of the first control plane and the second control plane as standby.

5. The chassis of claim 1, further comprising:
a third module comprising a third switch fabric, wherein the third switch fabric comprises a third data plane and a third packet plane;
wherein the third module interconnects to the first module and the second module through the processor interface bus system; and
wherein the arbitration mechanisms are further configured to provide redundancy on one of the first module and the second module in a failure event on the first module.

6. The chassis of claim 5, wherein the arbitration mechanisms comprise redundancy rules for each of the first control plane, the second control plane, the first timing plane, the second timing plane, the first data plane, the second data plane, the third data plane, the first packet plane, the second packet plane, and the third packet plane.

7. The chassis of claim 1, further comprising:
a line module comprising an ingress and egress switch fabric, wherein the line module is interconnected to the first module and the second module;
wherein the line module, the first module, and the second module comprise a three stage Clos switch.

8. A network element with redundant switch fabric and switch controller modules, comprising:
a first module comprising a first control plane, a first timing plane, a first time division multiplexed (TDM) plane, and a first packet plane;
a second module comprising a second control plane, a second timing plane, a second TDM plane, and a second packet plane;
an interconnection between the first module and the second module; and
redundancy means for operating the first control plane and the first timing plane as primary and the second control plane and the second timing plane as standby, and for operating the second TDM plane as active and the first TDM plane as standby;
wherein the first packet plane and the second packet plane both operate as active.

9. The network element of claim 8, further comprising:
messaging means for providing module status between the first and second module.

10. The network element of claim 8, further comprising:
failure recovery means for switching between primary and standby between the first and second control plane, the first and second timing plane, and the first and second TDM plane responsive to a failure event; and
failure recovery means for switching packet traffic to one of the first packet plane and the second packet plane responsive to a failure event.

11. The network element of claim 8, further comprising:
a third switch module comprising an expansion TDM plane and an expansion packet plane, wherein the third switch module is interconnected to the first switch module and the second switch module; and
redundancy means for operating the expansion TDM plane as active and one of the first TDM plane and the second TDM plane as standby, and for operating the expansion switch packet plane as active and one of the first packet plane and the second packet plane as standby.

12. The network element of claim 11, further comprising:
failure recovery means for switching the expansion data TDM and the expansion packet plane responsive to a failure event.

13. The network element of claim 8, further comprising:
a line module comprising an ingress switch, an egress switch, and one or more client interfaces;
wherein the line module, the first module, and the second module comprise a three-stage Clos switch; and
wherein the three-stage Clos switch comprises a redundant switch controller and switch fabric module in two modules.

* * * * *